United States Patent
Smith et al.

(10) Patent No.: US 12,441,741 B2
(45) Date of Patent: Oct. 14, 2025

(54) RING CLOSING SYNTHESIS OF MACROCYCLIC MCL-1 INHIBITOR INTERMEDIATES

(71) Applicant: AMGEN INC., Thousand Oaks, CA (US)

(72) Inventors: Austin G. Smith, Cary, NC (US); Jason S. Tedrow, Salem, MA (US); Gabrielle St-Pierre, Thousand Oaks, CA (US); Oliver Ralf Thiel, Lexington, MA (US); Liang Huang, Thousand Oaks, CA (US); Philipp C. Roosen, Thousand Oaks, CA (US); John T. Colyer, Newbury Park, CA (US); Kyle D. Baucom, Ventura, CA (US); Ari Ericson, Thousand Oaks, CA (US); Matthew G. Beaver, Natick, MA (US); Rahul P. Sangodkar, Boston, MA (US); Michael A. Lovette, Camarillo, CA (US); Robert Ronald Milburn, Belmont, CA (US); Alan H. Cherney, Somerville, MA (US); Sheng Cui, Lexington, MA (US)

(73) Assignee: AMGEN INC., Thousand Oaks, CA (US)

( * ) Notice: Subject to any disclaimer, the term of this patent is extended or adjusted under 35 U.S.C. 154(b) by 483 days.

(21) Appl. No.: 17/922,619

(22) PCT Filed: May 5, 2021

(86) PCT No.: PCT/US2021/030780
§ 371 (c)(1),
(2) Date: Nov. 1, 2022

(87) PCT Pub. No.: WO2021/226168
PCT Pub. Date: Nov. 11, 2021

(65) Prior Publication Data
US 2023/0167130 A1 Jun. 1, 2023

Related U.S. Application Data

(60) Provisional application No. 63/020,958, filed on May 6, 2020.

(51) Int. Cl.
*C07D 513/10* (2006.01)
*C07D 267/16* (2006.01)

(52) U.S. Cl.
CPC ......... *C07D 513/10* (2013.01); *C07D 267/16* (2013.01)

(58) Field of Classification Search
CPC .. C07D 513/10; C07D 267/16; C07D 281/00; C07D 513/08; C07D 267/12; A61K 31/553; A61P 35/00
See application file for complete search history.

(56) References Cited

U.S. PATENT DOCUMENTS

| 9,562,061 B2 | 2/2017 | Brown et al. |
| 10,300,075 B2 | 5/2019 | Brown et al. |

FOREIGN PATENT DOCUMENTS

| JP | 2012519705 | 8/2012 |
| WO | 2008131000 | 10/2008 |

(Continued)

OTHER PUBLICATIONS

PCT/US21/30780 International Search Report and Written Opinion (11 pages).

*Primary Examiner* — Joseph K McKane
*Assistant Examiner* — Ashli Ariana Chicks

(57) ABSTRACT

Provided herein are processes for synthesizing Mcl-1 inhibitors and intermediates such as compound F that can be used to prepare them where the variable PG is as defined herein. In particular, provided herein are processes for synthesizing compound A1, and salts or solvates thereof and compound A2, and salts and solvates thereof.

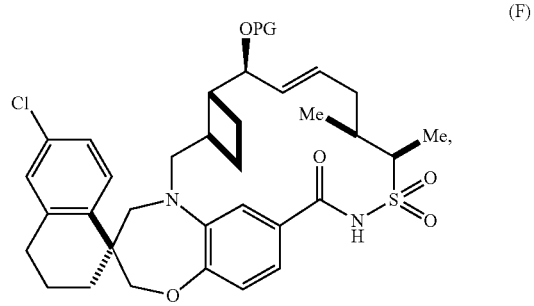

(F)

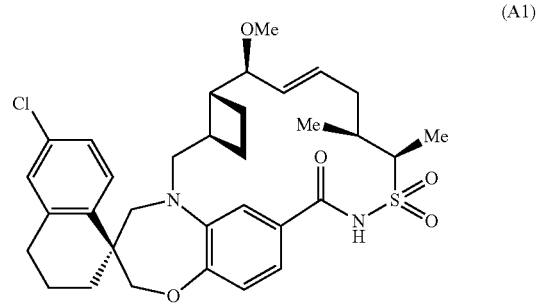

(A1)

(Continued)

-continued (A2)

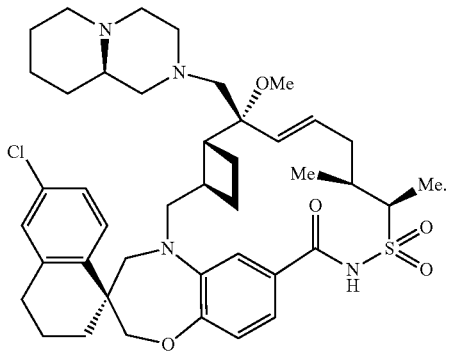

62 Claims, No Drawings

(56) References Cited

FOREIGN PATENT DOCUMENTS

| WO | 2010102219 | 9/2010 |
| WO | 2016/033486 A1 | 8/2017 |
| WO | 2020103864 A1 | 5/2020 |
| WO | 2018/183418 A1 | 6/2021 |

RING CLOSING SYNTHESIS OF MACROCYCLIC MCL-1 INHIBITOR INTERMEDIATES

CROSS REFERENCES TO RELATED APPLICATIONS

This application claims the benefit of U.S. Provisional Application No. 63/020,958, filed on May 6, 2020, which is hereby incorporated by reference in its entirety and for all purposes as if fully set forth herein.

BACKGROUND

Technical Field

The present disclosure relates to processes for synthesizing intermediates useful in preparing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa [8,16,18,24]tetraen]-15'-one 13',13'-dioxide (compound A1; AMG 176), a salt, or solvate thereof and in preparing (1S,3'R,6'R,7'R,8'E,11'S,12'R)-6-chloro-7'-methoxy-11',12'-dimethyl-7'-((9aR)-octahydro-2H-pyrido[1,2-a]pyrazin-2-ylmethyl)-3,4-dihydro-2H,15'H-spiro[naphthalene-1,22'-[20]oxa[13]thia[1,14]diazatetracyclo [14.7.2.0$^{3,6}$.0$^{19,24}$]pentacosa[8,16,18,24]tetraen]-15'-one 13',13'-dioxide (compound A2; AMG 397), a salt, or solvate thereof. These compounds are inhibitors of myeloid cell leukemia 1 protein (Mcl-1).

Description of Related Technology

The compound, (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A1), is useful as an inhibitor of myeloid cell leukemia 1 (Mcl-1):

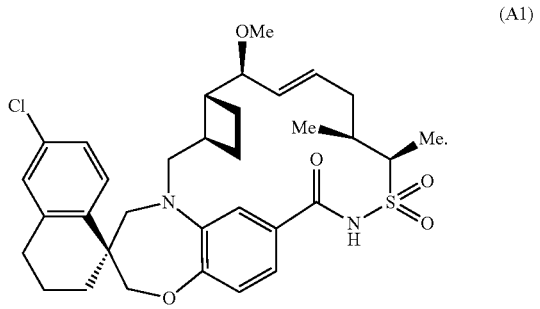

(A1)

The compound, (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H,15'H-spiro[naphthalene-1,22'-[20]oxa[13]thia[1,14]diazatetracyclo [14.7.2.0$^{3,6}$.0$^{19,24}$]pentacosa[8,16,18,24]tetraen]-15'-one 13',13'-dioxide (compound A2), is useful as an inhibitor of myeloid cell leukemia 1 (Mcl-1):

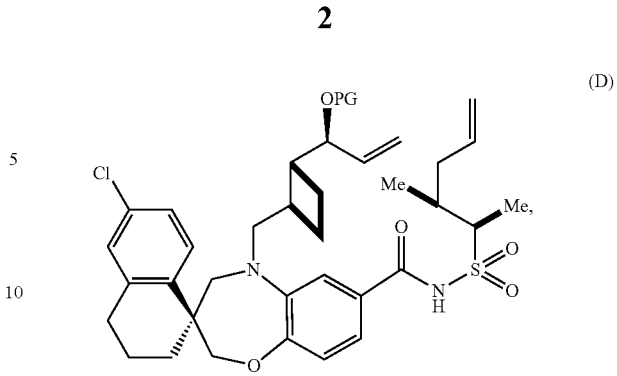

(D)

One common characteristic of human cancer is overexpression of Mcl-1. Mcl-1 overexpression prevents cancer cells from undergoing programmed cell death (apoptosis), allowing the cells to survive despite widespread genetic damage.

Mcl-1 is a member of the Bcl-2 family of proteins. The Bcl-2 family includes pro-apoptotic members (such as BAX and BAK) which, upon activation, form a homo-oligomer in the outer mitochondrial membrane that leads to pore formation and the escape of mitochondrial contents, a step in triggering apoptosis. Antiapoptotic members of the Bcl-2 family (such as Bcl-2, Bcl-XL, and Mcl-1) block the activity of BAX and BAK. Other proteins (such as BID, BIM, BIK, and BAD) exhibit additional regulatory functions. Research has shown that Mcl-1 inhibitors can be useful for the treatment of cancers. Mcl-1 is overexpressed in numerous cancers.

U.S. Pat. No. 9,562,061, which is incorporated herein by reference in its entirety, discloses compound A1 as an Mcl-1 inhibitor and provides a method for preparing it. However, improved synthetic methods that result in greater yield and purity of compound A1 are desired, particularly for the commercial production of compound A1.

U.S. Pat. No. 10,300,075, which is incorporated herein by reference in its entirety, discloses compound A2 as an Mcl-1 inhibitor and provides a method for preparing it. However, improved synthetic methods that result in greater yield and purity of compound A2 are desired, particularly for the commercial production of compound A2.

SUMMARY

Provided herein is a compound having a structure of compound D:

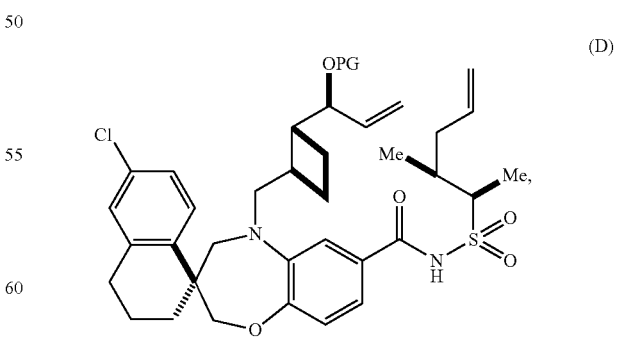

(D)

or a salt or solvate thereof, wherein PG is an alcohol protecting group.

In various embodiments, the PG is an ether, a silyl ether, an acetal or ketal, or an acyl. In some cases, the PG is an acyl. In some cases, the acyl is acetyl, pivaloyl, benzoyl (Bz), 4-bromobenzoyl (Br-Bz), 4-chlorobenzoyl, 4-iodobenzoyl, 4-fluorobenzoyl, 4-nitrobenzoyl, 4-phenylbenzoyl, 1-naphthoyl, or 2-naphthoyl. In some cases, PG is acetyl. In some cases, PG is pivaloyl. In some cases, PG is benzoyl, 4-bromobenzoyl, 4-nitrobenzoyl, 4-phenylbenzoyl, 1-naphthoyl, or 2-naphthoyl. In some cases, PG is 4-bromobenzoyl. In some cases, PG is an ether. In some cases, the ether is methoxy, ethoxy, propoxy, butoxy, methoxymethyl acetal (MOM), 2-methoxyethoxymethyl ester (MEM), ethoxyethyl acetal (EE), methoxypropyl ether (MOP), benzyloxymethyl acetal (BOM), benzyl ether (Bn), 4-methoxybenzyl ether (PMB), or 2-naphthylmethyl ether (Nap). In some cases, PG is an acetal or ketal. In some cases, PG is tetrahydropyranyl acetal (THP). In some cases, PG is a silyl ether. In some cases, PG is triethylsilyl ether (TES), triisopropylsilyl ether (TIPS), trimethylsilyl ether (TMS), tert-butyldimethylsilyl ether (TBS), or tert-butyldiphenylsilyl ether (TBDPS).

Also provided herein are process for synthesizing compound D, or a salt or solvate thereof:

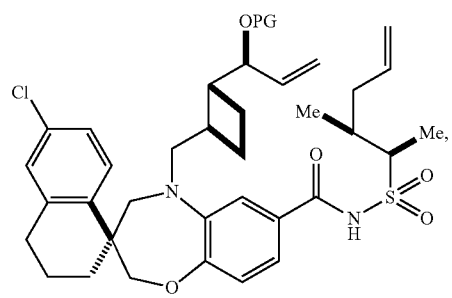

(D)

comprising:

admixing compound C, an activating agent, an amine base, and Compound E in the presence of a solvent to form compound D or a salt or solvate thereof

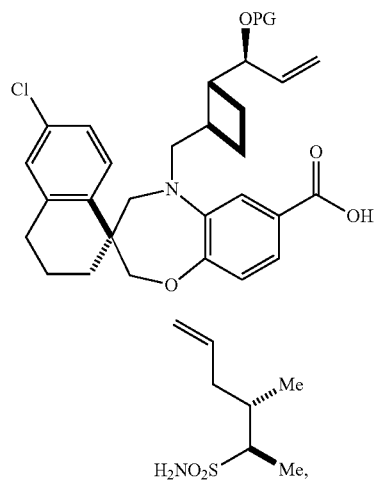

(C)

and (E)

wherein PG is an alcohol protecting group.

In various embodiments, the processes further comprise synthesizing compound C by admixing compound B and a protecting group reagent to form compound C:

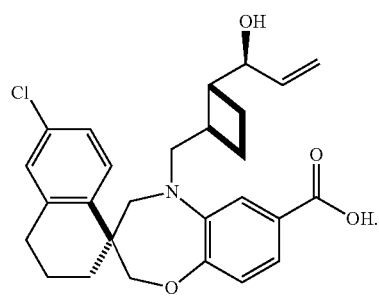

(B)

In some cases, compound B and the protecting group reagent are admixed with a base. In some cases, the base comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), NaH, KH, $K_2CO_3$, $Na_2CO_3$, $Li_2CO_3$, $Cs_2CO_3$, or a combination thereof. In some cases, the base comprises pyridine, triethylamine, or a combination thereof.

In various embodiments, the PG is an ether, a silyl ether, an acetal or ketal, or an acyl. In some cases, the PG is an acyl. In some cases, the acyl is acetyl, pivaloyl, benzoyl (Bz), 4-bromobenzoyl (Br-Bz), 4-nitrobenzoyl, 4-phenylbenzoyl, 1-naphthoyl, or 2-naphthoyl. In some cases, PG is acetyl. In some cases, PG is pivaloyl. In some cases, PG is benzoyl, 4-bromobenzoyl, 4-nitrobenzoyl, 4-phenylbenzoyl, 1-naphthoyl, or 2-naphthoyl. In some cases, PG is 4-bromobenzoyl. In some cases, PG is an ether. In some cases, the ether is methoxy, ethoxy, propoxy, butoxy, methoxymethyl acetal (MOM), 2-methoxyethoxymethyl ester (MEM), ethoxyethyl acetal (EE), methoxypropyl ether (MOP), benzyloxymethyl acetal (BOM), benzyl ether (Bn), 4-methoxybenzyl ether (PMB), or 2-naphthylmethyl ether (Nap). In some cases, PG is an acetal or ketal. In some cases, PG is tetrahydropyranyl acetal (THP). In some cases, PG is a silyl ether. In some cases, PG is triethylsilyl ether (TES), triisopropylsilyl ether (TIPS), trimethylsilyl ether (TMS), tert-butyldimethylsilyl ether (TBS), or tert-butyldiphenylsilyl ether (TBDPS). In some cases, PG is acetyl and synthesizing compound C comprises admixing compound B, acetic anhydride, triethylamine, and 4-dimethylaminopyridine (DMAP) in the absence of solvent.

In various embodiments, PG is 4-bromobenzoyl, and synthesizing compound C comprises admixing compound B, 4-bromobenzoyl chloride, and pyridine in a solvent. In some cases, the solvent comprises tetrahydrofuran ("THF"), 2-methyltetrahydrofuran, cyclopentyl methyl ether, tert-butyl methyl ether, 1,2-dimethoxyethane, toluene, hexane, heptane, 1,4-dioxane, dichloromethane, 1,2-dichloroethylene, or a combination thereof.

In various embodiments, the admixing of compound B and the protecting group reagent is for 30 minutes to 48 hours. In some cases, the admixing is for 1.5 hours.

In various embodiments, admixing compound B and the protecting group reagent is at a temperature of 0° C. to 40° C.

In various embodiments, compound B, prior to admixing with the protecting group reagent, is prepared as a free acid (compound B free acid) from a salt form (Compound B salt). In some cases, compound B salt is an ammonium salt. In some cases, compound B salt comprises a cation of

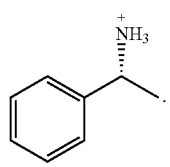

In various embodiments, compound B free acid is prepared by admixing compound B salt and phosphoric acid in a solvent to form the compound B free acid. In some cases, the solvent comprises 2-methyltetrahydrofuran (2-MeTHF) or toluene.

In various embodiments, the activating agent comprises an acid anhydride, acid chloride agent, carbodiimide agent, uronium agent, aminium agent, phosphonium agent, or a combination thereof. In some cases, the activating agent is $SOCl_2$, oxalyl chloride, propanephosphonic acid anhydride, or a combination thereof.

In various embodiments, the amine base for admixing compound C and compound E comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), or a combination thereof. In some cases, the amine base comprises diisopropylethylamine, triethylamine, or a combination thereof.

In various embodiments, compound E and compound C are present in a molar ratio of 1:1 to 1.5:1 Compound C:Compound E.

In various embodiments, admixing compound C, compound E, the activating agent and amine base occurs in a solvent. In some cases, the solvent comprises tetrahydrofuran ("THF"), 2-methyltetrahydrofuran, cyclopentyl methyl ether, tert-butyl methyl ether, dichloromethane, dichloroethane, 1,2-dimethoxyethane, toluene, hexane, heptane, 1,4-dioxane, N,N'-dimethylformamide, N,N'-dimethylacetamide, N-methyl-2-pyrrolidone, or a combination thereof. In some cases, the solvent comprises toluene.

Further provided herein are processes for synthesizing compound A, or a salt or solvate thereof:

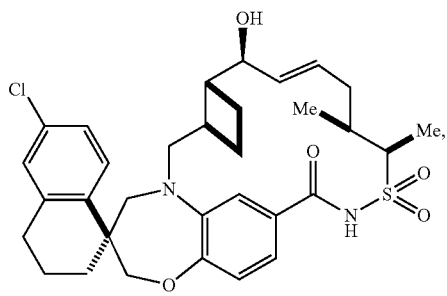

comprising:
admixing an organometallic catalyst and compound D

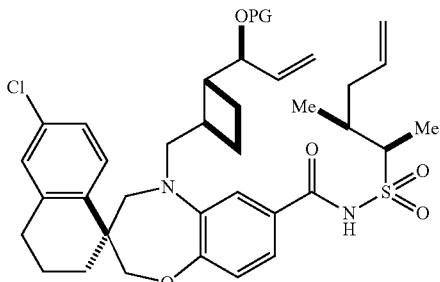

or salt or solvate thereof in a solvent, to form compound F

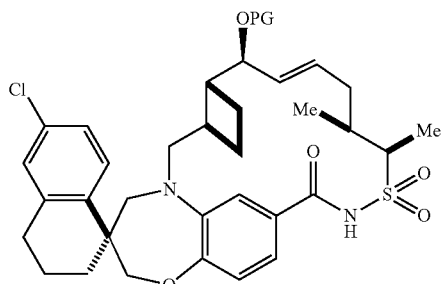

or a salt thereof. In various embodiments, compound D is synthesized by the processes described herein.

In various embodiments, the organometallic catalyst comprises molybdenum or ruthenium. In some cases, the organometallic catalyst comprises a Grubbs' 1st generation catalyst, Grubbs' 2nd generation catalyst, Grubbs' 3rd generation catalyst, Hoveyda-Grubbs' 1st generation catalyst, Hoveyda-Grubbs' 2nd generation catalyst or a combination thereof. In some cases, the organometallic catalyst is

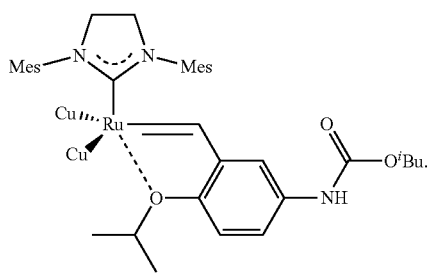

In various embodiments, the solvent comprises a nonpolar organic solvent. In some cases, the solvent is toluene, hexane, heptane, 1,4-dioxane, or a combination thereof.

In various embodiments, the admixing of compound D and the organometallic catalyst is at a temperature of about 50° C. to about 115° C. In some cases, the admixing of compound D and the organometallic catalyst is at a temperature of about 80° C.

In various embodiments, the processes further comprising deprotecting compound F to form compound A.

In various embodiments, compound A is used to synthesize Compound A1 or a salt or solvate thereof

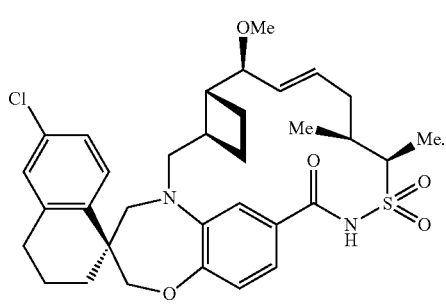

(A1)

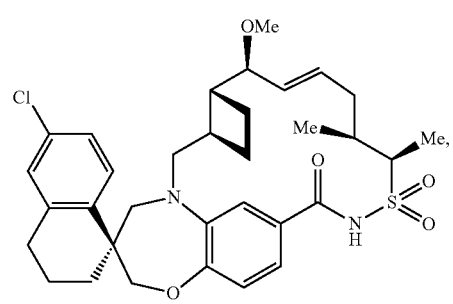

(A1)

In various embodiments, compound A is used to synthesize Compound A2 or a salt or solvate thereof

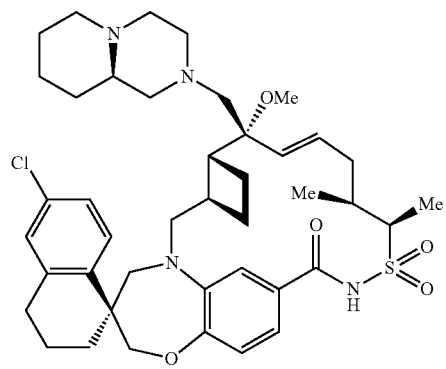

(A2)

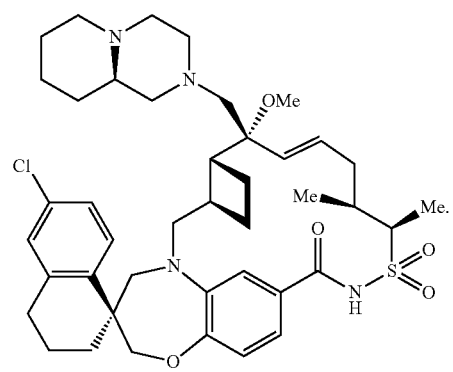

(A2)

U.S. Pat. No. 9,562,061, which is incorporated herein by reference in its entirety, discloses compound A1, or a salt or solvate thereof, as an Mcl-1 inhibitor and provides a process for preparing it. U.S. Pat. No. 9,562,061 also discloses a process of synthesizing a macrocyclic Mcl-1 inhibitor intermediates shown below used in the synthesis of compound A:

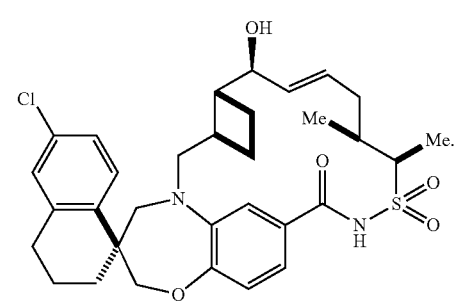

(A)

Further aspects and advantages will be apparent to those of ordinary skill in the art from a review of the following detailed description. The description hereafter includes specific embodiments with the understanding that the disclosure is illustrative, and is not intended to limit the invention to the specific embodiments described herein.

DETAILED DESCRIPTION

Provided herein are processes for synthesizing Mcl-1 inhibitors and corresponding macrocyclic Mcl-1 inhibitor intermediates. In particular, processes for synthesizing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$] pentacosa [8,16,18,24]tetraen]-15'-one 13',13'-dioxide (compound A1), or a salt or solvate thereof and for synthesizing (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H,15'H-spiro [naphthalene-1,22'-[20]oxa[13]thia[1,14]diazatetracyclo [14.7.2.0$^{3,6}$.0$^{19,24}$]pentacosa[8,16,18,24]tetraen]-15'-one 13',13'-dioxide (compound A2), or a salt or solvate thereof are provided:

U.S. Pat. No. 10,300,075, which is incorporated herein by reference in its entirety, discloses compound A2, or a salt or solvate thereof, as an Mcl-1 inhibitor and provides a process for preparing it. The disclosure of compound A2 salts and solvates from U.S. Pat. No. 10,300,075 is incorporated by reference in its entirety. This patent also discloses a process of synthesizing macrocyclic Mcl-1 inhibitor intermediates such as that shown above used in the synthesis of compound A.

In particular, the '061 patent describes a process for synthesizing compound A, shown in Scheme 1, below, at e.g., columns 93-94 of the '061 patent.

Scheme 1-Prior Synthesis of Compound A

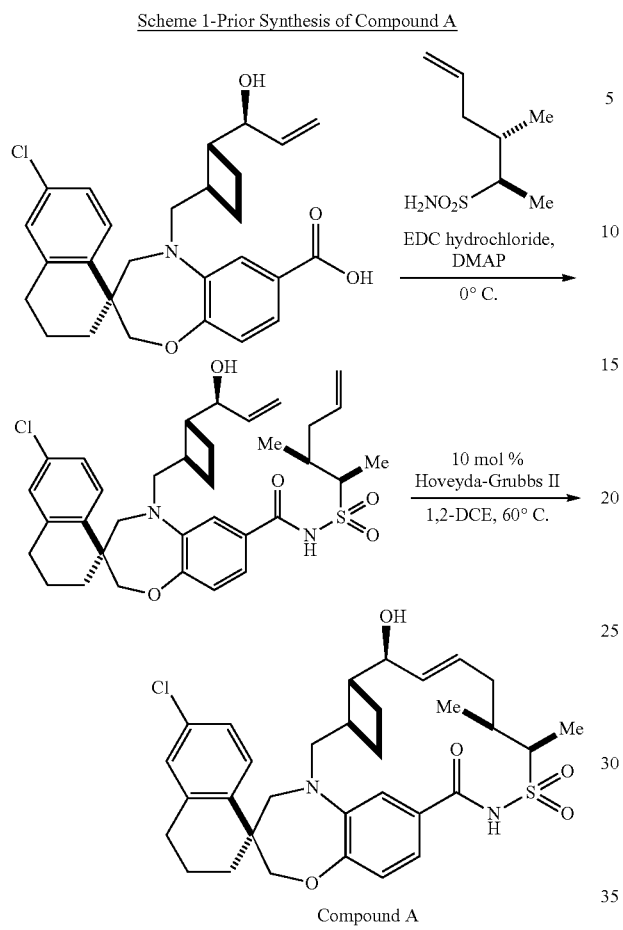

Compound A

The process shown above has several disadvantages. The processes of Scheme 1 are not adequately scalable. Although the reported yields in the '061 patent for the steps in Scheme 1 are adequate, these reported yields are on a small scale. Upon scaling these processes up, the yields decrease dramatically. For example, when the processes of Scheme 1 are scaled to larger quantities (e.g., 20 g or more), the yield of the first step (sulfonamide coupling) shown in Scheme 1 is about 35% and the yield of the second step (metathesis reaction) of Scheme 1 is about 60%, which provides an overall yield over the two steps of about 21%. Particularly, the first step of Scheme 1 has a poor yield and many impurities upon scaling up that need to be removed prior to the subsequent metathesis step. Chromatography is required to purify the product after the first step. Further, the metathesis reaction without a protected alcohol as shown in Scheme 1, requires high catalyst loading (e.g., 10 mol %, based on the mols of the product of the first step) and dilute conditions in an environmentally undesirable solvent (e.g., 1,2-DCE) which limits product throughput upon scaling this reaction up to larger quantities. The second step of Scheme 1 has a poor yield and many impurities (e.g., isomerized and dimeric byproducts) upon scaling up. Chromatography is required to purify the product after the second step as well.

Advantageously, the processes described herein utilize more favorable reaction conditions (e.g., has environmentally friendly solvents), the yield is higher than the process of Scheme 1 and less byproducts are produced. For example, the yield of the sulfonamide addition can be improved from 35% in Scheme 1 to 76%-90% in the processes described herein. Further, the processes described herein utilize more environmentally benign solvents and reagents, and do not require chromatography to purify the products of each step. The processes described herein have improved throughput over the prior art due to the utilization of an allylic alcohol protecting group which minimizes dimeric impurities and isomeric impurities in both the sulfonamide coupling step as well as the ring closing metathesis step. The processes described herein utilize protected allylic alcohol intermediates, rendering these intermediates crystalline, which aids scale up, long term storage, and purification. Provided herein are processes for synthesizing compound A or a salt, or solvate thereof:

(A)

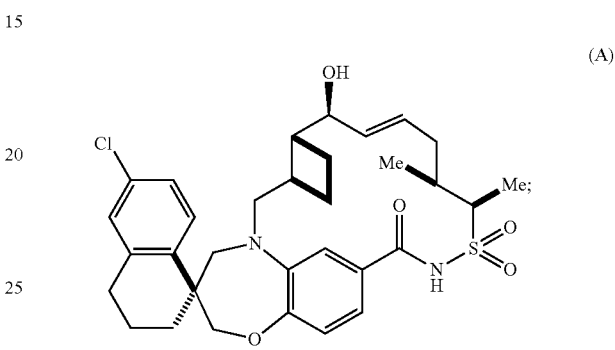

comprising: admixing compound C, an activating agent, an amine base, and Compound E in the presence of a solvent to form compound D or a salt or solvate thereof (C)

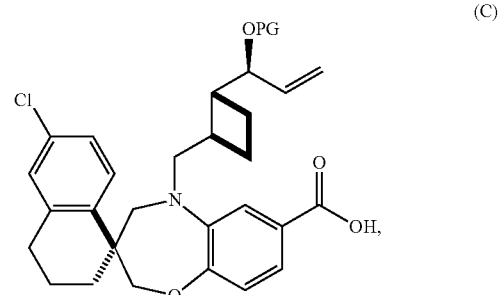

(E)

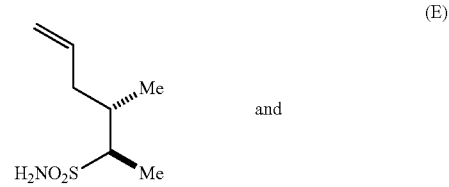

and (D)

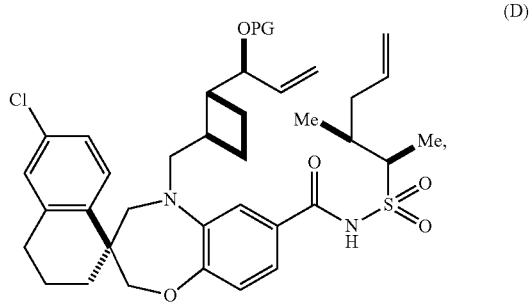

wherein PG is an alcohol protecting group, as discussed in detail below. As will be appreciated, the disclosed processes involve formation of a protected vinylic alcohol intermediate, compound D, by the addition of compound E to compound C.

Further, provided herein is a compound having a structure of compound D:

(D)

or a salt or solvate thereof, wherein PG is an alcohol protecting group.

Also, provided herein are processes for synthesizing compound A, or a salt or solvate thereof:

(A)

comprising: admixing an organometallic catalyst and compound D (D)

or salt or solvate thereof in a solvent, to form compound F

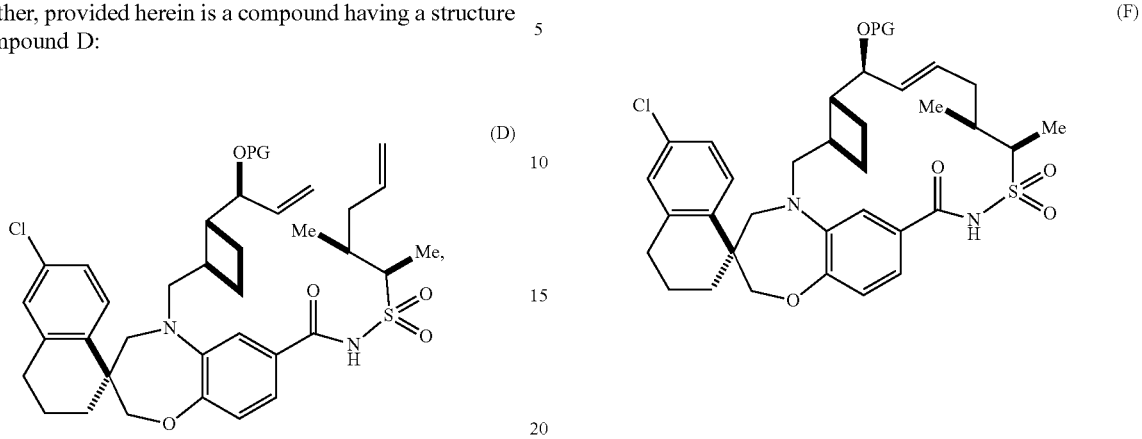

or a salt thereof.

A general reaction scheme for the processes described herein is provided in the scheme below:

General Process for Synthesis of Macrocyclic Mcl-1 Inhibitor Intermediates

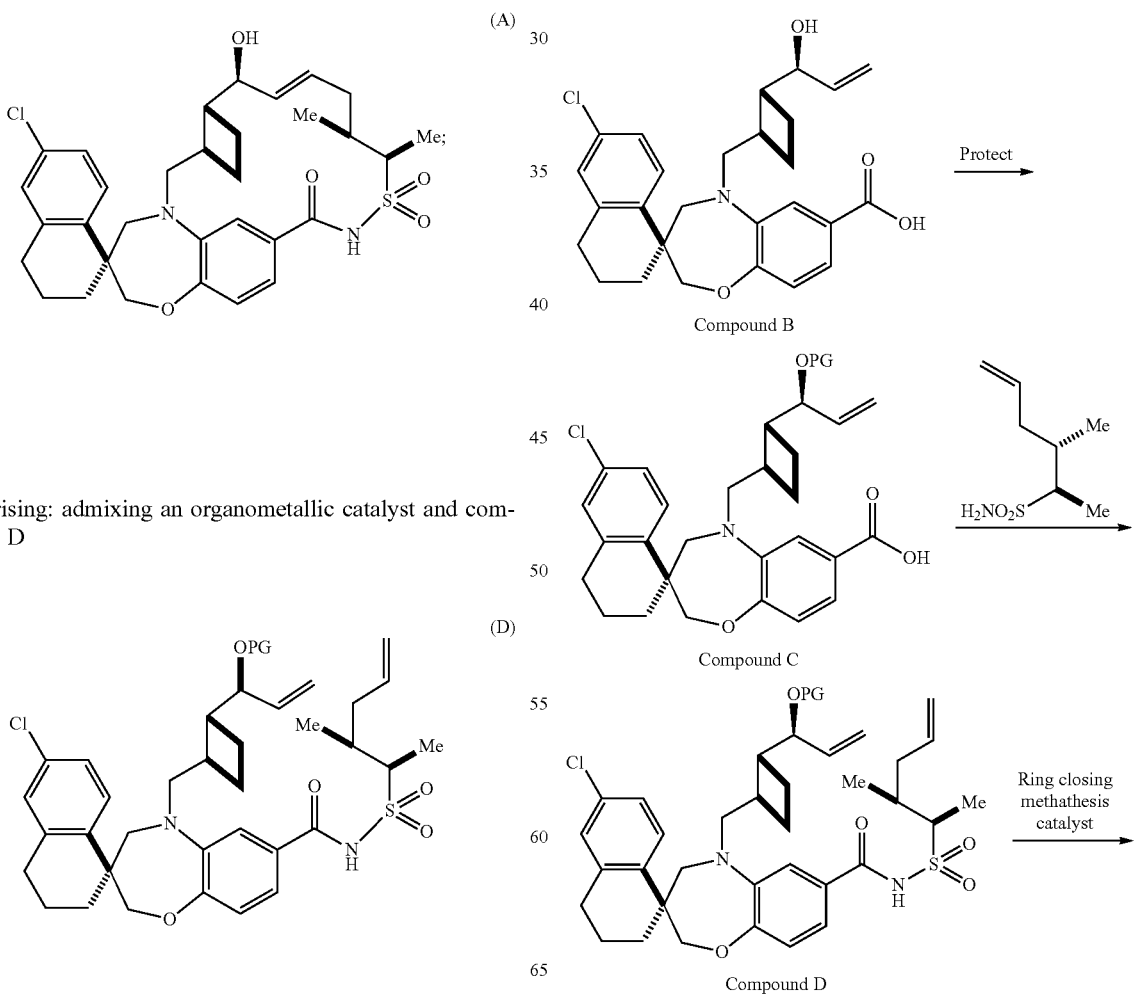

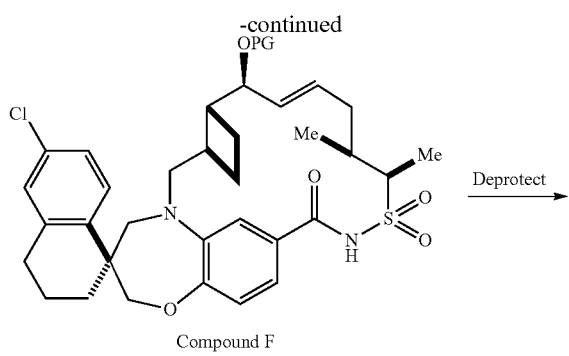

Compound F

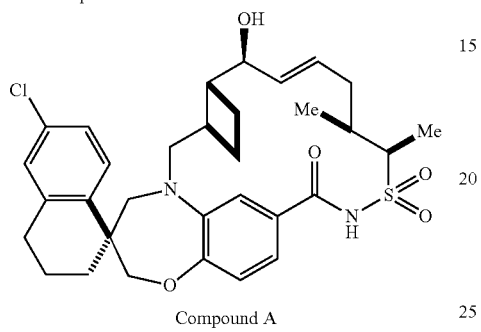

Compound A

Protection of Compound B

The processes of the disclosure can include protecting compound B to provide compound C. The process herein can comprise synthesizing compound C by admixing compound B and a protecting group reagent to form compound C. In some embodiments, compound B and the protecting group reagent can be admixed with a base.

As provided herein, compound B has a structure of (B)

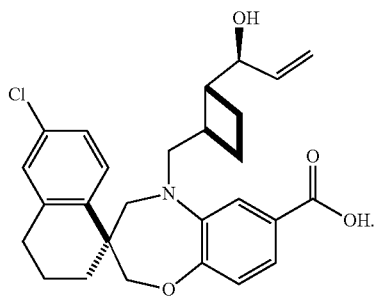

In some embodiments, compound B is a salt. A salt of compound B, or any other compound described herein, can be prepared, for example, by reacting the compound in its free base form with a suitable organic or inorganic acid, and optionally isolating the salt thus formed. Nonlimiting examples of suitable salts for any one or more of the compounds described herein include hydrobromide, hydrochloride, sulfate, bisulfate, sulfonate, camphorsulfonate, phosphate, nitrate, acetate, valerate, oleate, palmitate, stearate, laurate, benzoate, lactate, phosphate, tosylate, citrate, maleate, fumarate, succinate, tartrate, naphthylate, mesylate, glucoheptonate, lactobionate, laurylsulphonate salts, and amino acid salts, and the like. In some embodiments, the compound B salt comprises an ammonium cation. In some embodiments, the ammonium cation is

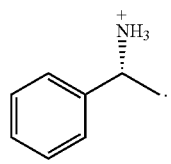

In some embodiments, compound B, prior to admixing with the protecting group reagent, is prepared as a free acid from a salt form, compound B':

(B')

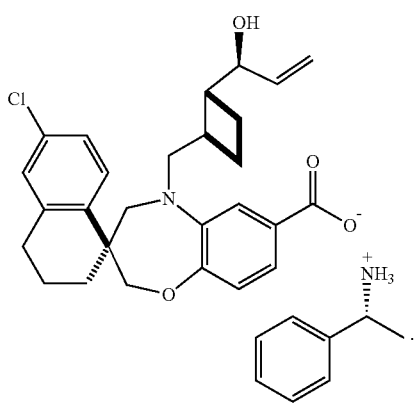

Compound B is reacted with an alcohol protecting group reagent, which thereby protects the alcohol of compound B. Alcohol protecting groups are groups that mask a hydroxyl functional group, and are well known in the art. Preparation of compounds can involve the protection and deprotection of various hydroxyl groups. The need for protection and deprotection, and the selection of appropriate protecting groups, and protecting group reagents, can be readily determined by one skilled in the art. The chemistry of protecting groups can be found, for example, in Greene, et al., Protective Groups in Organic Synthesis, 4d. Ed., Wiley & Sons, 2007, which is incorporated herein by reference in its entirety. Adjustments to the alcohol protecting groups and formation and cleavage methods described herein may be adjusted as necessary in light of the various substituents. Nonlimiting examples of suitable alcohol protecting group reagents include acyl halides (e.g., acetyl chloride, pivaloyl chloride, 4-bromobenzoyl chloride, etc.), acyl anhydrides (e.g., acetic anhydride, maleic anhydride, etc.), silyl halides (e.g., trimethylsilyl chloride, chlorotriethylsilane, triisopropylsilyl chloride, etc.), and sulfonyl halides (e.g., methanesulfonyl chloride, etc.). Other alcohol protecting group reagents that can be used to provide the alcohol protecting group, PG, as described herein, are also contemplated.

As described above, alcohol protecting groups are groups that mask a hydroxyl functional group, and are well known in the art. In some embodiments, the alcohol protecting group (PG) can be an ether, a silyl ether, an acetal or ketal, or an acyl.

In some embodiments, PG is an ether. Ether protecting groups comprise an alkyl moiety, either substituted or unsubstituted, attached to the oxygen from the hydroxyl group being protected (e.g., masked as an ether). Examples of suitable ethers include, but are not limited to, methoxy, ethoxy, propoxy, butoxy, tert-butoxy, methoxymethyl acetal (MOM), 2-methoxyethoxymethyl ester (MEM), ethoxyethyl acetal (EE), and methoxypropyl ether (MOP). Other examples of contemplated ethers include, but are not limited to, benzyloxymethyl acetal (BOM), benzyl ether (Bn), 4-methoxybenzyl ether (PMB), and 2-naphthylmethyl ether (Nap).

In some embodiments, PG is an acetal or ketal. Acetals as a protecting group have a general structure of

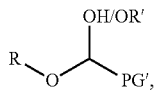

and can be as acetals (as OR' option, where R' is, e.g., an alkyl group) or as hemiacetals (as OH option), where R—O is derived from the hydroxyl group being protected and PG' is the rest of the (hemi)acetal protecting group. Ketals as a protecting group have a general structure of

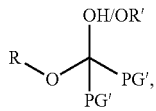

where R—O is derived from the hydroxyl group being protected and can be as ketals (as OR' option, where R' is, e.g., an alkyl group) or as hemiketals (as OH option), and each PG' is derived from the rest of the (hemi)ketal protecting group) masking the hydroxyl group (i.e., R—OH) and can be substituted or unsubstituted. An example of a suitable acetal includes, but is not limited to, tetrahydropyranyl acetal (THP).

In some embodiments, PG is an acyl. As used herein, the term "acyl" refers to an alcohol protecting group in which the oxygen atom of the alcohol is bound to an acyl group —

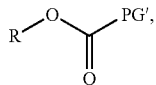

where R—O is derived from the hydroxyl group being protected and PG' is derived from the rest of the acyl protecting group. In some embodiments, the acyl protecting group is selected from the group consisting of acetyl, pivaloyl, benzoyl, 4-bromobenzoyl, 4-nitrobenzoyl, 4-phenylbenzoyl, 1-naphthoyl, 2-napthoyl, 4-methoxybenzoyl, and isobutyryl.

In some embodiments, PG is a silyl ether. As used herein, the term "silyl ether" refers to an alcohol protecting group in which the oxygen atom of the alcohol is bound to a silyl ether group —

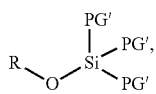

where R—O is derived from the hydroxyl group being protected and each PG' is derived from the rest of the silyl ether protecting group. In some embodiments, the silyl ether protecting group is selected from the group consisting of OSiEt$_3$ (triethylsilyl ether, TES), OSi($^i$Pr)$_3$ (triisopropylsilyl ether, TIPS), OSiMe$_3$ (trimethylsilyl ether, TMS), OSiMe$_2$tBu (tert-butyldimethylsilyl ether, TBS), and OSiPh$_2$$^t$Bu (tert-butyldiphenylsilyl ether, TBDPS).

In some embodiments, PG is a sulfonyl protecting group. As used herein, the term "sulfonyl protecting group" refers to an alcohol protecting group in which the oxygen atom of the alcohol is bound to a sulfonyl group —

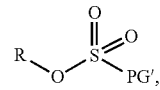

where R—O is derived from the hydroxyl group being protected and PG' is derived from the rest of the sulfonyl protecting group. In some embodiments, the sulfonyl protecting group is selected from the group consisting of mesyl, tosyl, nosyl, and triflyl.

In some embodiments, PG is selected from the group consisting of

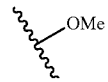

(methoxy),

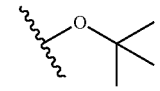 [SMILES: *OC(C)(C)C]

(tert-butyl ether),

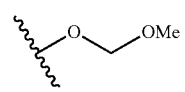

(methoxymethyl acetal, MOM),

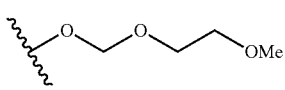 [SMILES: *OCOCCOC]

(2-methoxyethoxymethyl ether, MEM),

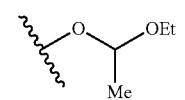

(ethoxyethyl acetal, "EE),

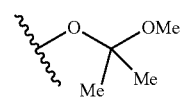

(methoxypropyl acetal, MOP),

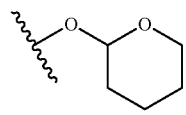 [SMILES: *OC1CCCCO1]
(tetrahydropyranyl acetal, "THP),
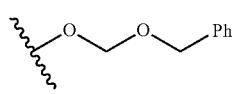 [SMILES: *OCOCc1ccccc1]
(benzyloxymethyl acetal, BOM),
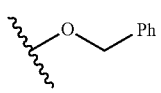
(benzyl ether, Bn),
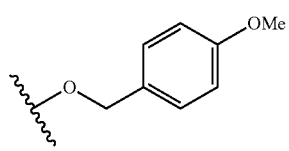 [SMILES: *OCc1ccc(OC)cc1]
(4-methoxybenzyl ether, PMB),
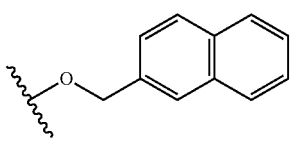 [SMILES: *OCc1ccc2ccccc2c1]
(2-naphthylmethyl ether, Nap),
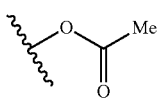
(acetyl, Ac),
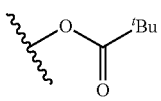
pivaloyl (Piv),
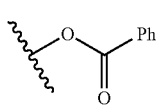
(benzoyl, Bz),
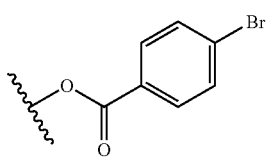 [SMILES: *OC(=O)c1ccc(Br)cc1]
(4-bromobenzoyl, Br-Bz),
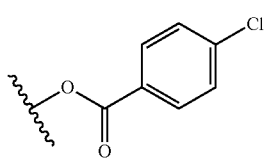 [SMILES: *OC(=O)c1ccc(Cl)cc1]
(4-chlorobenzoyl),
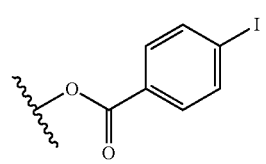 [SMILES: *OC(=O)c1ccc(I)cc1]
(4-iodobenzoyl),
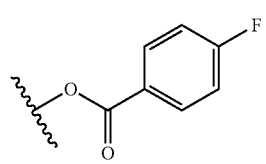 [SMILES: *OC(=O)c1ccc(F)cc1]
(4-fluorobenzoyl),
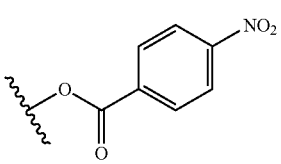 [SMILES: *OC(=O)c1ccc([N+](=O)[O-])cc1]
(4-nitrobenzoyl),
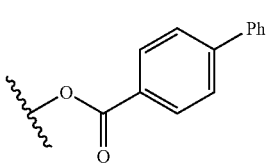
(4-phenylbenzoyl),

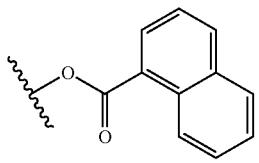 [SMILES: *OC(=O)c1cccc2ccccc12]

(1-naphthoyl ester),

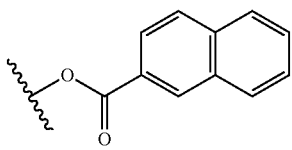 [SMILES: *OC(=O)c1ccc2ccccc2c1]

(2-naphthoyl ester),

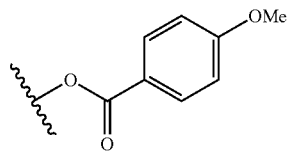 [SMILES: *OC(=O)c1ccc(OC)cc1]

(4-methoxybenzoyl), and

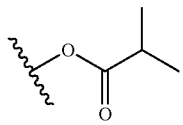 [SMILES: *OC(=O)C(C)C]

(isobutyryl). In some embodiments, PG is

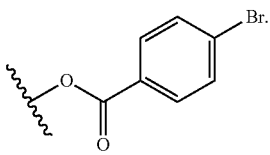 [SMILES: *OC(=O)c1ccc(Br)cc1]

In some embodiments, PG is

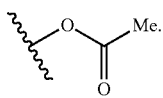

In general, the protecting group reagent can be any suitable protecting group reagent known to one of ordinary skill in the art as is used to protect an alcohol (hydroxyl group). In some embodiments, the protecting group reagent can comprise acetic anhydride or acetyl chloride. In some embodiments, the protecting group reagent can comprise 4-bromobenzoyl chloride.

In some embodiments, the admixing of compound B and the protecting group reagent can be performed in the presence of an organic solvent. Organic solvents are generally known in the art. Nonlimiting examples of organic solvents that can be used for the protection of the hydroxyl group of compound B include acetonitrile, toluene, benzene, xylene, chlorobenzene, fluorobenzene, naphthalene, benzotrifluoride, tetrahydrofuran (THF), tetrahydropyran, dimethylformamide (DMF), tetrahydrofurfuryl alcohol, diethyl ether, dibutyl ether, diisopropyl ether, methyl tert-butyl ether (MTBE), 2-methyltetrahydrofuran (2-MeTHF), dimethyl sulfoxide (DMSO), 1,2-dimethoxyethane (1,2-DME), 1,2-dichloroethane (1,2-DCE), 1,4-dioxane, cyclopentylmethyl ether (CPME), chloroform, carbon tetrachloride, dichloromethane (DCM), methanol, ethanol, propanol, 2-propanol, and tert-butanol. In some embodiments, the organic solvent comprises toluene.

The organic solvent can be present in an amount of 5 L/kg of compound B to 50 L/kg of compound B, for example, at least 5, 10, 15, 20, 25, or 30 L/kg of compound B and/or up to 50, 45, 40, 35, 30, 25, or 20 L/kg of compound B, such as 10 to 40 L/kg of compound B, 15 to 30 L/kg of compound B, or 15 L/kg to 20 L/kg of compound B.

Compound B and the protecting group reagent can be present in a molar ratio of 1:1 to 1:5, for example, at least a molar ratio of 1:1, 1:1.25, 1:1.5, 1:1.75, 1:2, 1:2.25, 1:3.5, and/or up to 1:5, 1:3, 1:2.75, 1:2.5, 1:2.25, 1:2, or 1:1.5, such as 1:1 to 1:2.5, 1:1 to 1:2, 1:1 to 1:1.5, 1:1.25 to 1:2, or 1:1.25 to 1:1.75. In some embodiments, the molar ratio of compound B to the protecting group reagent is 1:3. In some embodiments, the molar ratio of compound B to the protecting group reagent is 1:1.5. In some cases, the protecting group reagent is acetic anhydride and the molar ratio of compound B to protecting group reagent is 1:1.25 to 1:5. In some cases, the protecting group reagent is bromobenzoyl chloride and the molar ratio of compound B to protecting group reagent is 1:1.5 to 1:5.

The protecting of compound B can be performed in the presence of a base, for example, an amine base (e.g., mono-, di-, or trialkylamines, substituted or unsubstituted piperidines, substituted or unsubstituted pyridines). In some embodiments, the base comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), NaH, KH, $K_2CO_3$, $Na_2CO_3$, $Li_2CO_3$, $Cs_2CO_3$, or a combination thereof. In some embodiments, the base is selected from the group consisting of triethylamine, diisopropylethanolamine, N-methylpyrrolidine, N-ethylpiperidine, pyridine, 2,2,6,6-tetramethylpiperidine (TMP), pempidine, 2,6-lutidine, and a combination thereof. In some embodiments, the base is triethylamine. In some embodiments, the base is pyridine.

When a base is present in the admixing of compound B and the protecting group reagent, compound B and the base can be present in a molar ratio of 1:1 to 1:15, for example, at least 1:1, 1:2, 1:3, 1:4, 1:5, 1:6, 1:7, 1:8, 1:9, 1:10, 1:12.5, 1:15, and/or up to 1:10, 1:9, 1:8, 1:7, or 1:6, such as 1:1 to 1:10, 1:1.5 to 1:5, or 1:5 to 1:10, 1:5 to 1:15, or 1:4 to 1:8, or 1:4 to 1:6. In some embodiments, the molar ratio of compound B to the base is 1:5. In some embodiments, the molar ratio of compound B to the base is 1:1.5. In some cases, the base is triethylamine and the molar ratio of compound B to base is 1:1.25 to 1:3. In some cases, the base is pyridine and the molar ratio of compound B to base is 1:5 to 1:15.

In some embodiments, compound B and the protecting group reagent can be further admixed with a 4-dimethylaminopyridine (DMAP). When DMAP is present in the admixing of compound B and the protecting group reagent, compound B and DMAP can be present in a molar ratio of 1:0.05 to 1:5, for example, at least 1:0.05, 1:0.01, 1:0.05, 1:0.1, 1:0.5, 1:1, 1:2, 1:3, 1:4, such as 1:0.05 to 1:1, 1:1 to 1:5, or 1:0.1 to 1:3. In some embodiments, the molar ratio of compound B to DMAP is 1:0.2. In some embodiments, the molar ratio of compound B to DMAP is 1:2.

The protecting of compound B can occur at a temperature of 0° C. to 40° C., for example at least 0, 5, 10, 15, 20, 25, 30, or 40° C. and/or up to 10, 20, 30, 35, or 40, such as 0° C. to 30° C., 0° C. to 25° C., 15° C. to 30° C., 10° C. to 40° C., or 20° C. to 40° C. In some embodiments, the protecting of compound B occurs at a temperature of 40° C.

In some embodiments, the admixing compound B and the protecting group reagent can be for 30 minutes to 6 hours. For example, the admixing can be for 30 minutes, 1 hour, 1.5 hours, 2 hours, 3 hours, 4 hours, 5 hours, or 6 hours.

In some embodiments, compound B is provided as a salt. In some embodiments, compound B is provided as a carboxylic acid salt. In some embodiments, compound B is provided as a free acid.

In some embodiments, compound B, prior to admixing with the protecting group reagent, is prepared as a free acid from a salt form. In some embodiments, compound B free acid is prepared by admixing compound B salt and an acid in a solvent to form the compound B free acid. In some embodiments, the acid comprises phosphoric acid, HCl, citric acid, acetic acid, sulfuric acid, or a combination thereof. In some embodiments, the acid is phosphoric acid. In some embodiments, the acid is present at a concentration of 1 L/(kg compound B salt) to 20 L/(kg compound B salt). In some embodiments, the solvent comprises 2-methyltetrahydrofuran (2-MeTHF), tetrahydrofuran, or toluene. In some embodiments, the solvent comprise 2-MeTHF or toluene.

Synthesis of Compound D

The processes of the disclosure include admixing compound C, an activating agent, an amine base, and Compound E in the presence of a solvent to form compound D or a salt or solvate thereof

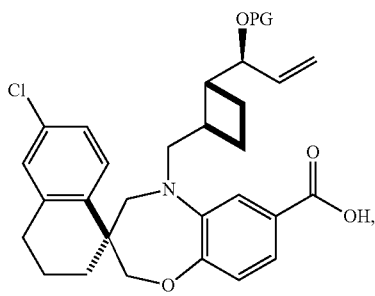

(C)

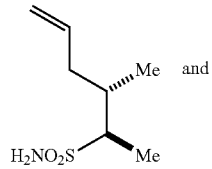

(E)

and

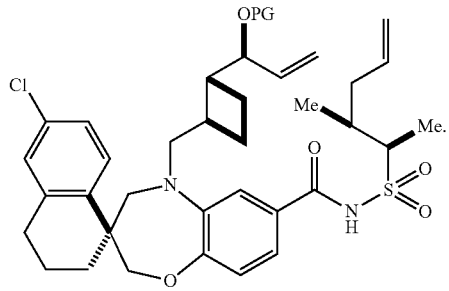

(D)

Advantageously, the processes of the disclosure provide the protection of the vinylic alcohol prior to the addition of compound E, differing from the synthesis procedure used in the prior art process of U.S. Pat. No. 9,562,061. The protection of the alcohol provides higher yields and greater efficiency. For example, the yield of the sulfonamide addition can be improved from 35% as in the prior synthesis shown in Scheme 1 to 76% in the processes described herein. Further, the processes described herein utilize a protecting group that provides crystalline intermediates aiding purification efforts, removing the necessity of chromatography, and provides long term stability.

As provided herein, compound C has a structure of

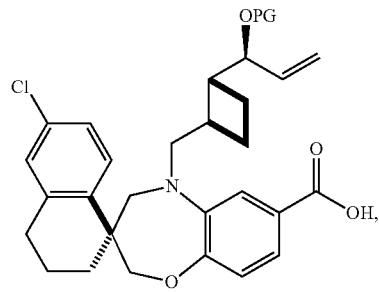

(C)

wherein PG is an alcohol protecting group as disclosed herein. In some embodiments, compound C is a salt. Salts of compound C can be similar to those as described herein for compound B. In some embodiments, PG is acetate (Ac). In some embodiments, PG is bromobenzoate (Br-Bz).

As provided herein, compound E has a structure of

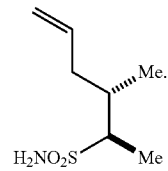

(E)

Compound C and compound E can be present in a molar ratio of 1:1 to 1:1.5, compound C:compound E, for example, 1:1, 1:1.1, 1:1.2, 1:1.3, 1:1.4, or 1:1.5. In some embodiments, the molar ratio of compound C to compound E is 1:1.1. In some embodiments, the molar ratio of compound C to compound E is 1:1.3.

In general, the activating agent can comprise an acid anhydride, acid chloride, carbodiimide agent, uranium agent, aminium agent, phosphonium agent, or a combination thereof. Contemplated acid anhydrides include acetic anhydride, propanoic anhydride, benzoic anhydride, succinic anhydride, butyric anhydride, hexanoic anhydride, and cyclohexanecarboxylic anhydride. Nonlimiting examples of acid chlorides include ethanoyl chloride, propanoyl chloride, butanoyl chloride, and benzoyl chloride. Nonlimiting examples of phosphonium agent include (hydroxymethyl)phosphonium chloride.

In some embodiments, the activating agent can comprise $SOCl_2$, oxalyl chloride, propanephosphonic acid anhydride (T3P®), or a combination thereof. In some embodiments, the activating agent is an acid chloride agent. In some embodiments, the acid chloride agent comprises $SOCl_2$. In some embodiments, the activating agent is an acid anhydride. In some embodiments, the acid anhydride comprises propanephosphonic acid anhydride (T3P®).

Compound C and the activating agent can be present in a molar ratio of 1:1 to 1:5, for example, at least 1:1, 1:1.5, 1:2, 1:3, 1:4, 1:5 such as 1:1 to 1:5, or 1:1.5 to 1:5, or 1:1 to 1:3, or 1:3 to 1:5. In some embodiments, the molar ratio of compound C to the activating agent is 1:1.5. In some embodiments, the molar ratio of compound C to the activating agent is 1:1.05. In some embodiments, the activating agent is $SOCl_2$ or oxalyl chloride and the molar ratio of compound C to activating agent is 1:1 to 1:1.2. In some embodiments, the activating agent is T3P and the molar ratio of compound C to activating agent is 1:1 to 1:2.

The synthesis of compound D can be performed in the presence of a base, for example, an amine base (e.g., mono-, di-, or trialkylamines, substituted or unsubstituted piperidines, substituted or unsubstituted pyridines). In some embodiments, the amine base can comprise pyridine, trimethylamine, triethylamine, aniline, diisopropylethylamine, 1,8-diazabicyclo [5.4.0]undec-7-ene (DBU), 1,4-diazabicyclo [2.2.2] octane (DABCO), or a combination thereof. In some embodiments, the amine base is selected from the group consisting of triethylamine, diisopropylethylamine, N-methylpyrrolidine, N-ethylpiperidine, pyridine, 2,2,6,6-tetramethylpiperidine (TMP), pempidine, 2,6-lutidine, and a combination thereof. In some embodiments, the amine base is triethylamine. In some embodiments, the amine base is diisopropylethylamine.

Compound C and the amine base can be present in a molar ratio of 1:1 to 1:15, for example, at least 1:1, 1:2, 1:3, 1:4, 1:5, 1:6, 1:7, 1:8, 1:9, 1:10, 1:12.5, 1:15, and/or up to 1:10, 1:9, 1:8, 1:7, or 1:6, such as 1:1 to 1:10, 1:1.5 to 1:5, or 1:5 to 1:10, 1:5 to 1:15, or 1:4 to 1:8, or 1:4 to 1:6. In some embodiments, the molar ratio of compound C to the amine base is 1:5. In some embodiments, the molar ratio of compound C to the base is 1:3.5. In some embodiments, the base is triethylamine or diisopropylethylamine, and the molar ratio of compound C to base is 1:2 to 1:5.

The synthesis of compound D can occur in the presence of a solvent. Nonlimiting examples of solvents that can be used for the synthesis of compound D from Compound C, an activating agent, a base, and Compound E include acetonitrile, toluene, benzene, xylene, chlorobenzene, fluorobenzene, naphthalene, benzotrifluoride, tetrahydrofuran (THF), tetrahydropyran, dimethylformamide (DMF), tetrahydrofurfuryl alcohol, diethyl ether, dibutyl ether, diisopropyl ether, methyl tert-butyl ether (MTBE), 2-methyltetrahydrofuran (2-MeTHF), dimethyl sulfoxide (DMSO), 1,2-dimethoxyethane (1,2-DME), 1,2-dichloroethane (1,2-DCE), 1,4-dixoane, cyclopentylmethyl ether (CPME), chloroform, carbon tetrachloride, dichloromethane (DCM), N,N'-dimethylacetamide (DMAc), and N-methyl-2-pyrrolidone (NMP). In some embodiments, the solvent comprises tetrahydrofuran ("THF"), 2-methyltetrahydrofuran, cyclopentyl methyl ether, tert-butyl methyl ether, dichloromethane (DCM), dichloroethane (DCE), 1,2-dimethoxyethane, toluene, hexane, heptane, 1,4-dioxane, or a combination thereof. In some embodiments, the organic solvent comprises toluene, MeTHF, THF, DCM, or DCE. In some embodiments, the solvent comprises toluene and DMF. In some embodiments, compound C and the DMF can be present in a molar ratio of 1:0.01 to 1:0.5, such as 1:0.05, 1:0.1, or 1:0.5.

The solvent can be present in an amount of 3 L/kg of compound C to 50 L/kg of compound C, for example, at least 3, 5, 10, 15, 20, 25, 30, 40, or 50 L/kg of compound C and/or up to 50, 45, 40, 35, 30, 25, or 20 L/kg of compound C, such as 3 to 20 L/kg of compound C, 15 to 30 L/kg of compound C, or 5 L/kg to 50 L/kg of compound C.

In some embodiments, the synthesis of compound D can further comprise admixing with a nucleophilic activator. In some embodiments, the nucleophilic activator comprises DMAP, pyridine, or a combination thereof. In some embodiments, the nucleophilic activator is pyridine.

In some embodiments, the nucleophilic activator is DMAP. When DMAP is present in the admixing, compound C and DMAP can be present in a molar ratio of 1:0.05 to 1:3, for example, at least 1:0.05, 1:0.01, 1:0.05, 1:0.1, 1:0.5, 1:1, 1:2, 1:3, 1:4, such as 1:0.05 to 1:1, 1:1 to 1:5, or 1:0.1 to 1:3. In some embodiments, the molar ratio of compound C to the DMAP is 1:0.1. In some embodiments, the molar ratio of compound C to the DMAP is 1:0.05 to 1:1. In some embodiments, the molar ratio of compound C to the DMAP is 1:0.25 to 1:2.

In the synthesis of compound D, the admixing can occur at a temperature of 0° C. to 115° C., for example, at 10, 15, 20, 25, 30, 40, 50, 75, 90, 100, 110, or 115° C. In some embodiments, the admixing can occur at a temperature of 0° C. to 35° C. In some embodiments, the admixing can occur at a temperature of 75° C. to 115° C.

In some embodiments, the admixing of compound C and the activating agent can occur prior to the addition of compound E. In some embodiments, the admixing of compound C and the activating agent can occur for 30 minutes to 72 hours. For example, the admixing can be for 30 minutes, 1 hour, 2 hours, 3 hours, 5 hours, 10 hours, 12 hours, 15 hours, 20 hours, 24 hours, 48 hours, or 72 hours.

In some embodiments, the admixing of compound C, compound E, the activating agent, and the amine base can be for 2 hours to 24 hours. For example, the admixing can be for 2 hours, 3 hours, 4 hours, 5 hours, 6 hours, 8 hours, 10 hours, 12 hours, 15 hours, 20 hours, or 24 hours.

In some cases, compound D is formed as a salt. Salts of compound D can be similar to those as described herein for compound B. In some embodiments, compound D is formed as a piperazine salt or a dicyclohexylamine salt. In some cases, compound D is formed as a solvate. Solvates of compound D can include, but not limited to, hydrates, such as a monohydrate or dihydrate. In some embodiments, compound D is formed as a monohydrate.

Compound D

Further provided herein is a compound having a structure of compound D (D)

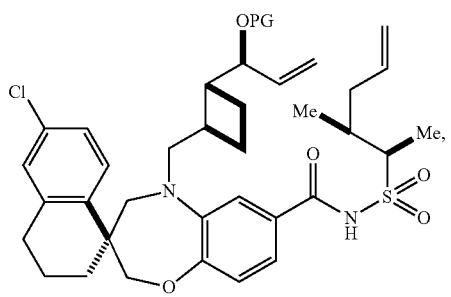

or a salt or solvate thereof, wherein PG is an alcohol protecting group as disclosed herein. In some embodiments, PG is an ether, a silyl ether, an acetal or ketal, or an acyl. In some embodiments, the acyl is acetyl, pivaloyl, benzoyl (Bz), 4-bromobenzoyl (Br-Bz), 4-chlorobenzoyl, 4-iodobenzoyl, 4-fluorobenzoyl, 4-nitrobenzoyl, 4-phenylbenzoyl, 1-naphthoyl, or 2-naphthoyl. In some embodiments, the ether is methoxy, ethoxy, propoxy, butoxy, methoxymethyl acetal (MOM), 2-methoxyethoxymethyl ester (MEM), ethoxyethyl acetal (EE), methoxypropyl ether (MOP), benzyloxymethyl acetal (BOM), benzyl ether (Bn), 4-methoxybenzyl ether (PMB), or 2-naphthylmethyl ether (Nap). In some embodiments, the acetal or ketal is tetrahydropyranyl acetal (THP). In some embodiments, the silyl ether is triethylsilyl ether (TES), triisopropylsilyl ether (TIPS), trimethylsilyl ether (TMS), tert-butyldimethylsilyl ether (TBS), or tert-butyldiphenylsilyl ether (TBDPS). In some embodiments, PG is acetyl. In some embodiments, PG is 4-bromobenzoyl. In some embodiments, compound D is a salt. Salts of compound D can be similar to those as described herein for compound B. In some cases, compound D is as a piperazine salt. In some cases, compound D is as a dicyclohexylamine salt. In some embodiments, compound D is a solvate. In some cases, compound D is as a hydrate. In some cases, compound D is as a free form (not as a salt or solvate form).

Ring Closing Metathesis

The processes of the disclosure herein can comprise admixing an organometallic catalyst and compound D (D)

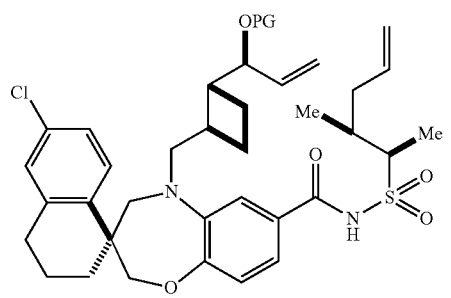

or salt or solvate thereof in a solvent, to form compound F (F)

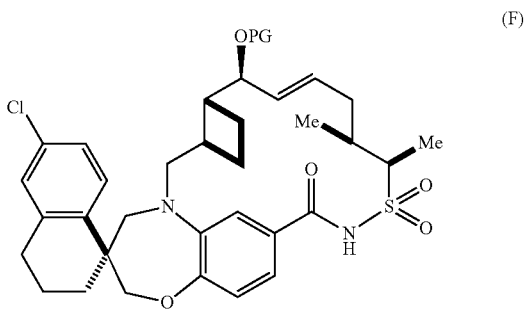

or a salt thereof. In some embodiments, compound D is synthesized by the processes disclosed herein.

Advantageously, the processes of the disclosure provide the protection of the vinylic alcohol prior to the ring closing metathesis, differing from the synthesis procedure disclosed in U.S. Pat. No. 9,562,061.

As provided herein, compound D has a structure of (D)

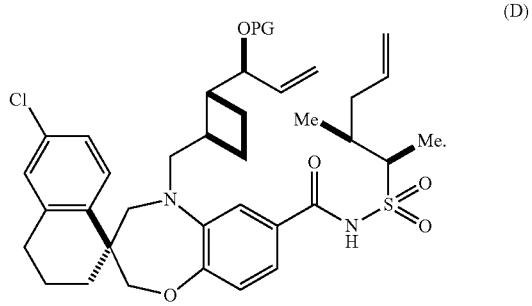

In some embodiments, compound D is provided in free form. In some embodiments, compound D is provided as a solvate. In some embodiments, compound D is provided as a hydrate. In some embodiments, compound D is provided as a salt. Salts of compound D can be similar to those as described herein for compound B. In some embodiments, the compound D salt comprises an ammonium cation. In some embodiments, the ammonium cation is a piperazine cation. In some embodiments, compound D is provided as compound D' a compound having a structure of (D')

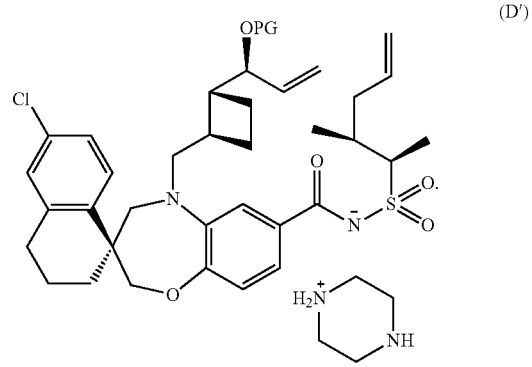

In some embodiments, compound D' can be converted to the free form of compound D prior to admixing with the organometallic catalyst. In some embodiments, the salt form of compound D is admixed with an acid (e.g., aqueous hydrochloric acid, phosphoric acid, citric acid, or sulfuric acid) to form compound D as a free form. The free form of compound D is taken on to the ring closing metathesis reaction with the organometallic catalyst. In some embodiments, compound D is provided as a monohydrate form that is first dried (e.g., by azeotropic distillation) to remove the water due to the hydrate form prior to compound D being used in the ring closing metathesis reaction with the organometallic catalyst.

In general, the organometallic catalyst can be any ring closing metathesis catalyst known to one of ordinary skill in the art. In some embodiments, the organometallic catalyst comprises molybdenum or ruthenium. In some embodiments, the organometallic catalyst can comprise one or more of Grubbs' catalysts. Numerous Grubbs' catalysts are known in the art (e.g., Grubbs' 1st generation catalyst, Grubbs' 2nd generation catalyst, Grubbs' 3rd generation catalyst, Hoveyda-Grubbs' 1st generation catalyst, Hoveyda-Grubbs' 2nd generation catalyst, etc.). Grubbs' catalysts are ruthenium based. One skilled in the art will appreciate that other ring closing metathesis organometallic catalysts, such as Schrock-type catalysts (which are molybdenum based), or Grela catalyst may be used in lieu of, or in addition to, Grubbs' catalysts in accordance with some embodiments. In some embodiments, the organometallic catalyst comprises Hoveyda-Grubbs' catalyst M730 (M73-SIMes), having a structure of

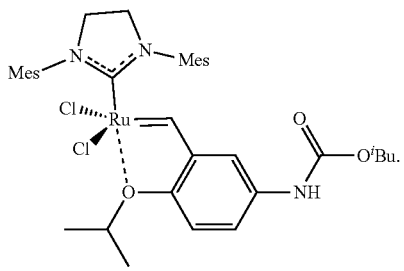

In some embodiments, the organometallic catalyst is Hoveyda-Grubbs' catalyst M730 (M73-SIMes).

Advantageously, when the Hoveyda-Grubbs' catalyst M73-SIMes is used in the ring-closing metathesis, both the yield and efficiency are improved compared to the process disclosed in U.S. Pat. No. 9,562,061, wherein a Hoveyda-Grubbs' II catalyst is used. The Hoveyda-Grubbs' catalyst M73-SIMes provides enhanced stability in this process compared to the previous synthesis shown in Scheme 1, extending the organometallic catalyst's lifetime. The Hoveyda-Grubbs' catalyst M73-SIMes is more catalytically active compared to the previous catalyst used allowing for the use of lower catalyst loading while maintaining a comparable or even higher yield. Further, the Hoveyda-Grubbs' catalyst M73-SIMes provides higher selectivity that improves not only the yield but the purity profile allowing for improved isolation of compound F and removing the need for chromatography.

The organometallic catalyst can be present at 0.01 mol % to 20 mol % (based upon compound D).

The ring closing metathesis reaction can occur in the presence of a solvent. In some embodiments, the solvent is a non-polar solvent. In some embodiments, the solvent comprises toluene, hexane, heptane, 1,4-dioxane, 1,2-dichloroethylene, dichloromethane, or a combination thereof. In some embodiments, the solvent comprises toluene.

The solvent can be present in an amount of 5 L/kg of compound D to 800 L/kg of compound D, for example, at least 3, 5, 10, 15, 20, 25, 30, 40, 50 L/kg, or 150 L/kg of compound D and/or up to 800, 700, 600, 500, 400, 300, 200, or 150 L/kg of compound D, such as 5 to 700 L/kg of compound D, 20 to 100 L/kg of compound D, or 20 L/kg to 200 L/kg of compound D, or 100 L/kg to 800 L/kg of compound D.

The admixing can occur at a temperature of 50° C. to 115° C., for example, at 50, 60, 70, 75, 80, 90, 100, 110, or 115° C. In some embodiments, the admixing can occur at a temperature of 80° C.

In some embodiments, the admixing of compound D and the organometallic catalyst can be for 30 minutes to 24 hours. For example, the admixing can be for 30 minutes, 1 hour, 1.5 hours, 2 hours, 3 hours, 4 hours, 5 hours, 6 hours, 8 hours, 10 hours, 12 hours, 15 hours, 20 hours, or 24 hours. In some embodiments, the admixing of compound D and the organometallic catalyst can be for at least 1 hour.

In some embodiments, the ring closing metathesis reaction can occur under inert atmosphere. In some embodiments, the inert atmosphere can comprise $N_2$, Ar, or a combination thereof. In some embodiments, the ring closing metathesis can occur under nitrogen.

In some embodiments, the ring closing metathesis reaction can occur under vacuum (reduced pressure). In some embodiments, the ring closing metathesis reaction can occur at a pressure of 200 to 500 torr. In some embodiments, the ring closing metathesis reaction can occur at atmospheric pressure in combination with inert gas sparging.

In some embodiments, the ring closing metathesis reaction can occur via continuous flow process. In some embodiments, the continuous flow process can comprise one or more continuous stirred-tank reactors (CSTR). In some embodiments, the continuous flow process comprises two CSTRs. In some embodiments, compound D and the organometallic catalyst are flowed into a CSTR for admixing. In some embodiments, prior to the addition of compound D and the organometallic compound to the CSTR, the CSTR is purged with inert gas, such as $N_2$ or Ar. In some embodiments, compound D, the organometallic catalyst, or both can be dissolved in a non-polar organic solvent as described herein prior to addition to the CSTR. In some embodiments, the non-polar organic solvent is toluene. In some embodiments, the flow rate of addition of compound D, the organometallic catalyst, or both, to the CSTR can be 0.1 mL/min to 50 mL/min. For example, the flow rate of addition of compound D, the organometallic catalyst, or both, to the CSTR can be 0.1 mL/min to 25 mL/min, or 0.1 mL/min to 10 mL/min, 0.5 mL/min to 5 mL/min, such as, 0.1 mL/min, 0.5 mL/min, 1 mL/min, 1.5 mL/min, 2 mL/min, 3 mL/min, 4 mL/min, 5 mL/min, 10 mL/min, 25 mL/min, 50 mL/min, 100 mL/min, 200 mL/min, or 500 mL/min or more.

In some embodiments, compound D is dissolved in a solvent in a first CSTR to form a first solution and the organometallic catalyst is dissolved in a solvent in a second CSTR to form a second solution. In some embodiments, the first solution and the second solution are flowed into a third CSTR over a period of 30 minutes to 24 hours or more. For example, the first solution and the second solution are flowed into a third CSTR over a period of 1 hour to 24 hours, or 2 hours to 20 hours, or 5 hours to 12 hours.

In some embodiments, compound D is dissolved in a solvent in a first CSTR to form a first solution and the first solution is flowed into a second CSTR. In some embodiments, the organometallic catalyst is added as a solid, in portions, to the second CSTR. In some embodiments, the first solution and the organometallic catalyst as a solid are added over 30 minutes to 24 hours. For example, the first solution and the organometallic catalyst as a solid are added over a period of 1 hour to 24 hours, or 2 hours to 20 hours, or 5 hours to 12 hours. In some embodiments, the organometallic catalyst can be added as a solid in 10 minute increments, 20 minute increments, 30 minute increments, 1 hour increments, or 2 hour increments, wherein each increment comprises a half, a quarter, or an eighth of the total amount of the organometallic catalyst.

Deprotecting Compound F

Processes for synthesizing compound A, or salt or solvate thereof can comprise admixing compound F

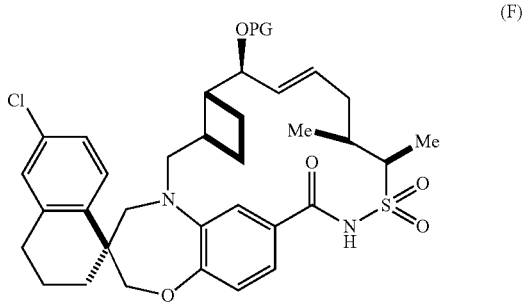

(F)

or a salt thereof, with a deprotecting agent to form compound A.

As provided herein, compound F has a structure of

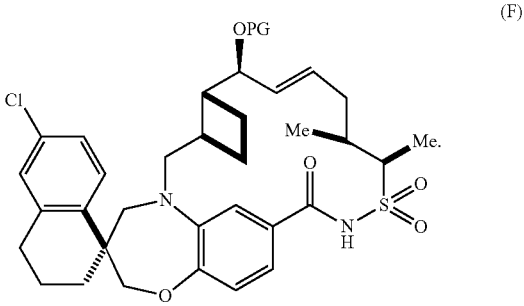

(F)

In some embodiments, compound F is provided in free form. In some embodiments, compound F is provided as a salt. Salts of compound F can be similar to those as described herein for compound B.

In some embodiments, the deprotecting agent includes acetyl chloride, an enzyme, an acid, a base, a metal hydride, or a combination thereof.

In some embodiments, the deprotecting agent includes acetyl chloride and an alcohol. As described herein, nonlimiting examples of alcohol solvents include methanol, ethanol, propanol, 2-propanol, and tert-butanol. In some embodiments, the alcohol is selected from the group consisting of methanol, ethanol, propanol, isopropanol, butanol, and a combination thereof. In some embodiments, the alcohol is methanol.

In some embodiments, the deprotecting agent includes a base. Nonlimiting examples of bases include an alkali metal hydroxide or an alkali metal alkoxide (e.g., methoxide, ethoxide, propoxide, etc.). In some embodiments, the base can comprise lithium, sodium, or potassium cation, or a combination thereof. In some embodiments, the base can comprise a hydroxide or methoxide anion. In some embodiments, the base is sodium methoxide. In some embodiments, the base is sodium hydroxide. Compound F and the base can be present in a molar ratio of 1:1 to 1:10, for example, at least 1:1, 1:2, 1:3, 1:4, 1:5, 1:6, 1:7, 1:8, 1:9, 1:10, and/or up to 1:10, 1:9, 1:8, 1:7, or 1:6, such as 1:1 to 1:10, 1:1.5 to 1:5, or 1:2 to 1:10, 1:2 to 1:6. In some embodiments, the molar ratio of compound F to the base is 1:2. In some embodiments, the molar ratio of compound F to the base is 1:6.

In some embodiments, the deprotecting agent includes an enzyme. Nonlimiting examples of suitable enzymes include ester hydrolases (e.g., NOVOZYM® 40086) and lipases (e.g., amano lipase PS). In some embodiments, the enzyme is selected from the group consisting of an ester hydrolase, a lipase, and a combination thereof. In some embodiments, the enzyme is an ester hydrolase. In some embodiments, the enzyme is a lipase.

In some embodiments, the deprotecting agent includes an acid. Nonlimiting examples of suitable acids include hydrochloric acid, sulfuric acid, phosphoric acid, trifluoroacetic acid (TFA), citric acid, hydrobromic acid, and acetic acid. In some embodiments, the acid is selected from the group consisting of hydrochloric acid, sulfuric acid, phosphoric acid, citric acid, and a combination thereof. In some embodiments, the acid is citric acid. In some embodiments, the acid is phosphoric acid.

Compound F and the weak acid can be present in a molar ratio of 1:1 to 1:20, for example, at least 1:1, 1:2, 1:3, 1:4, 1:5, 1:6, 1:7, 1:8, 1:9, 1:10, 1:15, 1:20, and/or up to 1:10, 1:9, 1:8, 1:7, or 1:6, such as 1:1 to 1:10, 1:2 to 1:5, or 1:5 to 1:10, or 1:3 to 1:9. In some embodiments, the molar ratio of compound F to the weak acid is 1:3. In some embodiments, the molar ratio of compound F to the weak acid is 1:9.

Deprotecting compound F can occur in the presence of a solvent. In some embodiments, the solvent can be an organic solvent disclosed herein, water, or an alcohol solvent (e.g., methanol, ethanol, isopropanol, etc.). In some embodiments, the solvent is methanol. In some embodiments, the solvent is water and MeTHF. In some embodiments, the solvent is water and THF. In some embodiments, the solvent is methanol and water.

The solvent can be present in an amount of 3 L/kg of compound D to 50 L/kg of compound F, for example, at least 3, 5, 10, 15, 20, 25, 30, 40, or 50 L/kg of compound F and/or up to 50, 45, 40, 35, 30, 25, or 20 L/kg of compound F, such as 3 to 20 L/kg of compound F, 15 to 30 L/kg of compound F, or 5 L/kg to 50 L/kg of compound F.

In some embodiments, compound A can be crystallized from the admixing of compound F and a deprotecting agent. In some embodiments, crystallization of compound A comprises heating a solution of compound A, then cooling the solution and adding a crystallizing solvent to the cooled solution to form crystals of compound A. In some embodiments, the crystallizing comprises heating a solution of compound A to 40° C. to 50° C., then cooling the solution to 15° C. to 25° C. (e.g., 20° C.) and adding a crystallizing solvent to the cooled solution to form crystals of compound A. In some embodiments, the solution of compound A comprises toluene, THF, or a combination thereof, and the crystallizing solvent comprises heptane. In some embodiments, the solution of compound A comprises 2-MeTHF and the crystallizing solvent comprises heptane.

The process for synthesizing compounds C, D, F, and A can be used to synthesize compounds A1 and A2. As shown in Scheme 4, compound A may be used to synthesize compound A1 and salts and solvates thereof and as shown in Scheme 5, compound A may also be used to synthesize compound A2 and salts and solvates thereof.

Conversion of Compound A to Compound A1

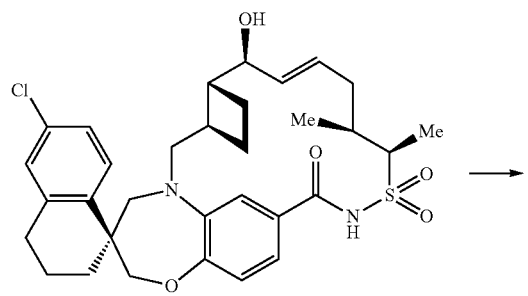

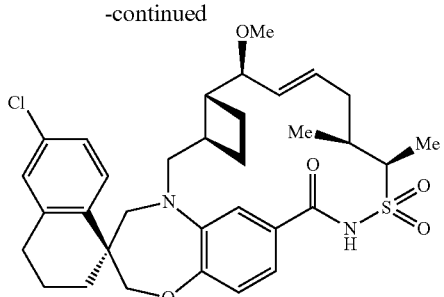

As shown above and described in U.S. Pat. No. 9,562,061, compound A may be used to synthesize compound A1 and salts and solvates thereof. As described herein, compound C, D, E and F may be used to prepare compound A. As set forth in U.S. Pat. No. 9,562,061, compound A can be methylated to provide compound A1.

Conversion of Compound A to Compound A2

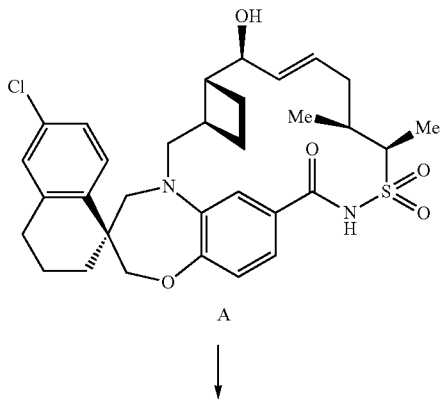

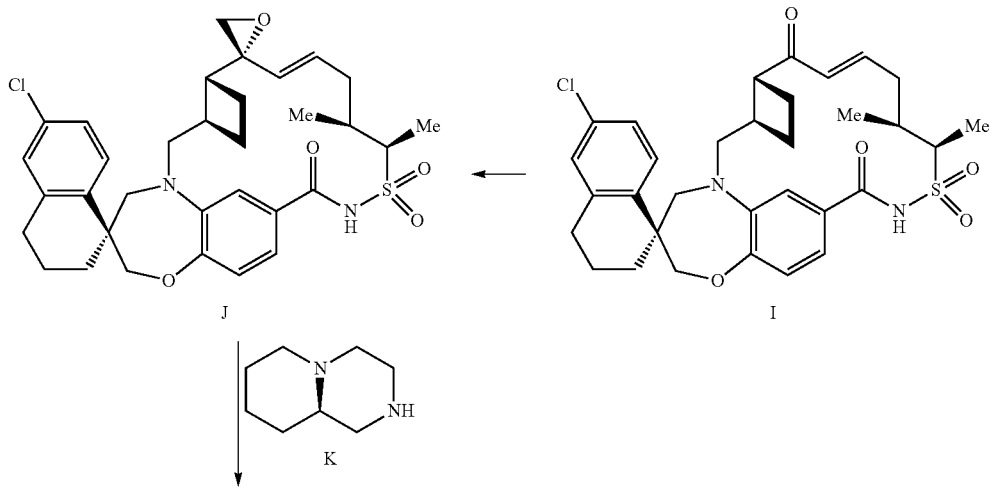

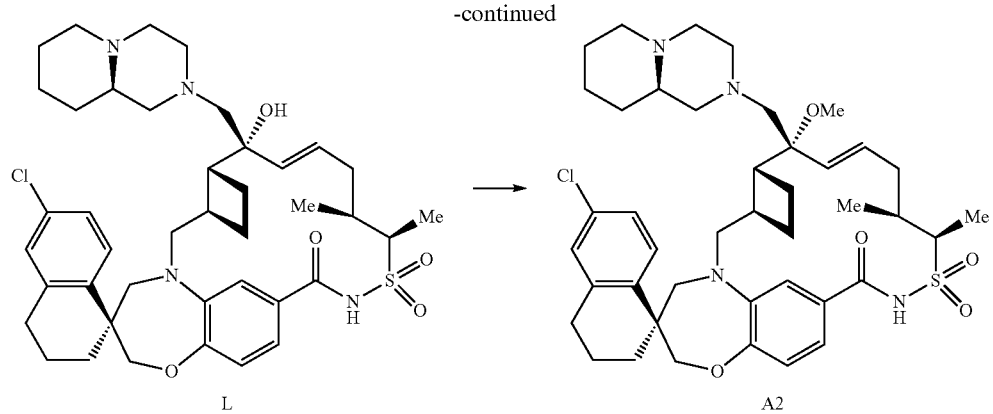

L → A2

As shown above and described in U.S. Pat. No. 10,300,075, compound A may be used to synthesize compound A2 and salts and solvates thereof. Compound A can be oxidized to provide cyclic enone I as disclosed in U.S. Pat. No. 10,300,075. Enone I can then be converted to epoxide J using the procedures disclosed in U.S. Pat. No. 10,300,075. Epoxide J can then be reacted with bicyclic compound K to provide hydroxy compound L. Finally, methylation of compound L provides compound A2 as disclosed in U.S. Pat. No. 10,300,075.

It is to be understood that while the disclosure is read in conjunction with the detailed description thereof, the foregoing description and following example are intended to illustrate and not limit the scope of the disclosure, which is defined by the scope of the appended claims. Other aspects, advantages, and modifications are within the scope of the following claims.

EXAMPLES

The following examples are provided for illustration and are not intended to limit the scope of the invention.

Example 1: Formation of Compound A Using an Acetyl PG

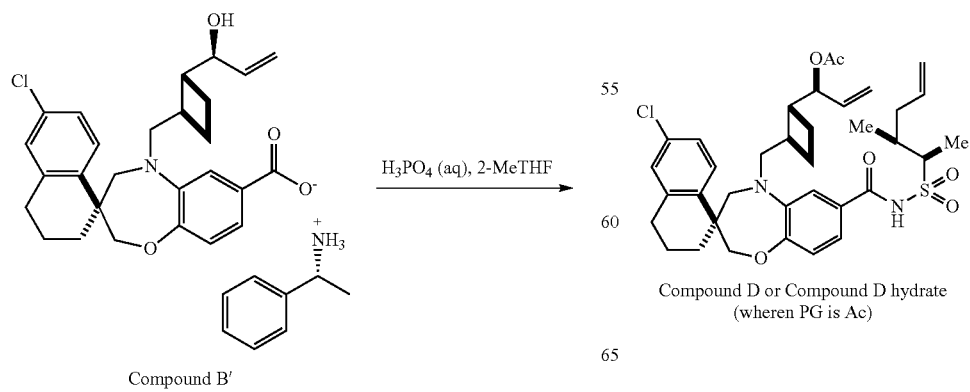

Compound B'

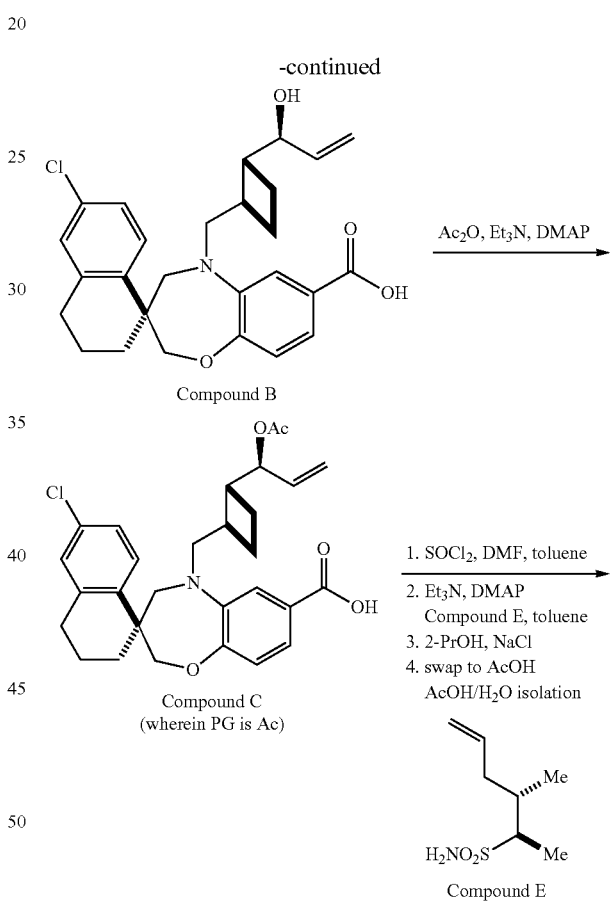

Compound B

Compound C (wherein PG is Ac)

Compound E

Compound D or Compound D hydrate (wheren PG is Ac)

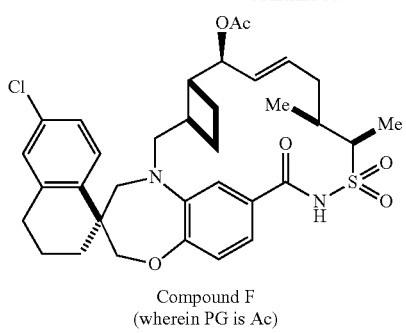

Compound F
(wherein PG is Ac)

NaOMe, MeOH
citric acid (aq)
THF/heptane

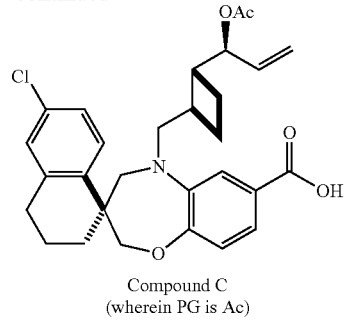

Compound C
(wherein PG is Ac)

(S)-5-(((1R,2R)-2-((S)-1-acetoxyallyl)cyclobutyl)methyl)-6'-chloro-3',4,4',5-tetrahydro-2H,2'H-spiro[benzo[b][1,4]oxazepine-3,1'-naphthalene]-7-carboxylic acid (Compound C, wherein PG is Ac): To a 2 L glass lined, jacketed reactor was charged compound B' (50 g, 84 mmol, 1.0 equiv.), followed by 2-MeTHF (350 mL, 7 L/kg). The slurry was stirred at RT, and 1M phosphoric acid was added (200 mL, 4 L/kg. Note: Exotherm from 20.7 to 24.1° C. observed upon addition of phosphoric acid). The mixture was allowed to stir vigorously for 1 hr, followed by the addition of brine (50 mL, 1 L/kg). The mixture was stirred for an additional 5 min, then stirring was halted and the phases were allowed to separate. The bottom layer was drained, and to the reactor was charged with 20% brine (250 mL, 5 L/kg). The mixture was agitated for >5 min, then stirring was halted and the layers allowed to settle. The bottom layer was drained, and to the reactor was charged water (250 mL, 5 L/kg). The mixture was allowed to stir for 5 min, then stirring was halted and the layers allowed to settle. The bottom layer was drained, and the top layer was azeotropically distilled at 60° C. under reduced pressure to remove water. The distillation was complete upon sampling the solution and analyzing for water content.

To a separate, jacketed reactor set to 22° C. was charged dimethylaminopyridine (DMAP) (2.057 g, 16.84 mmol, 0.20 equiv.), followed by dry 2-MeTHF (250 mL, 5 L/kg). The mixture was allowed to stir for 5 min, then triethylamine was added (17.6 ml, 126 mmol, 1.5 equiv.), followed by acetic anhydride (11.94 ml, 126 mmol, 1.5 equiv.). The mixture was stirred for 5 min at RT, then free form compound B as a solution in 2-MeTHF from the salt break was added. The mixture was stirred for 1.5 hrs and then sampled for conversion. Upon reaction completion, water was charged (250 mL, 5 L/kg) followed by 1M sodium phosphate dibasic buffer (150 mL, 3 L/kg). 1M NaOH solution was charged (150 mL, 3 L/kg), and the stirred, biphasic mixture was sampled for pH (expected pH 9-10. If pH is >13, adjust to pH 9-10 with 2M HCl). The biphasic mixture was then stirred vigorously for >6 hrs. Stirring was stopped, and the top layer was sampled for conversion. Upon reaction completion, 2M HCl was charged (250 mL, 5 L/kg). The biphasic mixture was stirred vigorously. The stirring was stopped, and the layers allowed to settle. The bottom layer was drained, and to the reactor was charged toluene (400 mL, 8 L/kg), followed by water (250 mL, 5 L/kg). The mixture was stirred vigorously and then the stirring was stopped and the layers allowed to settle. The bottom layer was drained, and to the reactor was charged 20% brine (250 mL, 5 L/kg). The mixture was stirred vigorously and then the stirring was stopped and the layers allowed to settle. The bottom layer was drained, and the top layer was distilled at 60° C. under reduced pressure to remove 2-MeTHF, H$_2$O,

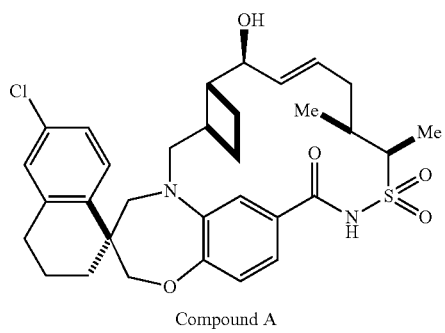

Compound A

Synthesis of Compound C (Wherein PG is Ac)

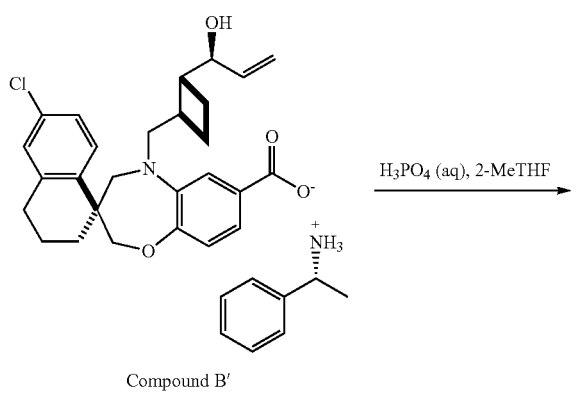

Compound B'

H$_3$PO$_4$ (aq), 2-MeTHF

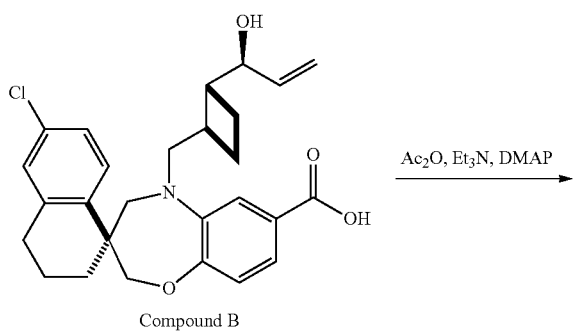

Compound B

Ac$_2$O, Et$_3$N, DMAP and acetic acid. The stream of compound C (wherein PG is Ac) in toluene was telescoped directly into the next step at 100% molar assay yield. LRMS (ESI): Calcd. for $C_{29}H_{32}ClNO_5+Na$: 532.2, found: 532.2.

Synthesis of Compound D (Wherein PG is Ac)

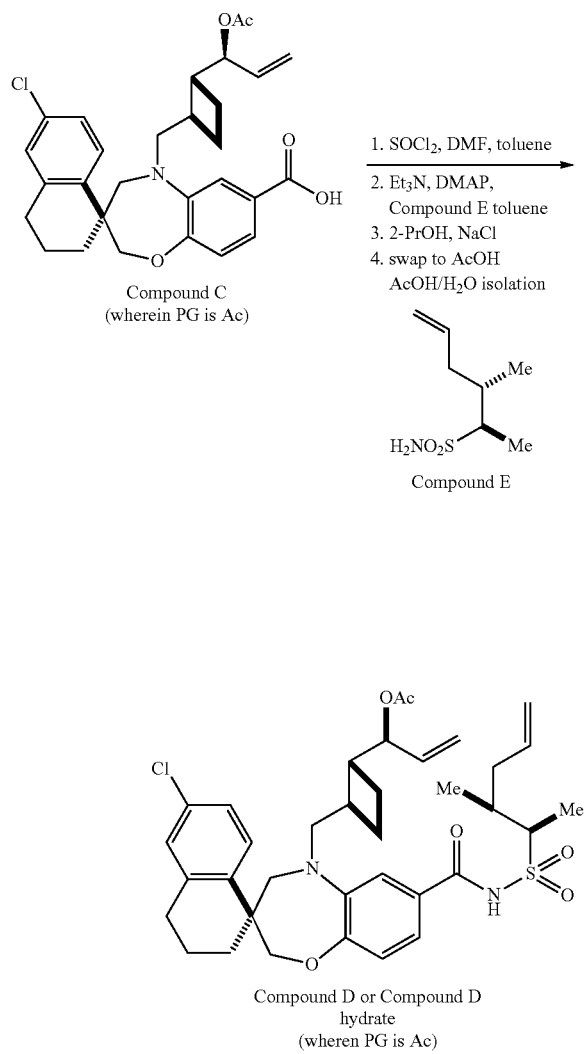

Compound C
(wherein PG is Ac)

1. $SOCl_2$, DMF, toluene
2. $Et_3N$, DMAP, Compound E toluene
3. 2-PrOH, NaCl
4. swap to AcOH
   AcOH/$H_2O$ isolation Compound E Compound D or Compound D hydrate
(wheren PG is Ac)

(S)-1-((1R,2R)-2-(((S)-6'-chloro-7-(((((2R,3S)-3-methyl-hex-5-en-2-yl)sulfonyl)carbamoyl)-3',4'-dihydro-2H,2'H-spiro[benzo[b][1,4]oxazepine-3,1'-naphthalen]-5(4H)-yl)methyl)cyclobutyl)allyl acetate (Compound D, wherein PG is Ac): To a solution of compound C (wherein PG is Ac) in toluene at 20-25° C. was charged a catalytic amount of dry dimethylformamide (DMF, 0.652 mL, 8.42 mmol, 0.1 equiv.). The reactor was equipped with an NaOH scrubber and catch tank, and a heavy $N_2$ sweep was initiated. In a separate flask under $N_2$ was added toluene (44 mL, 0.86 L/kg), followed by thionyl chloride (6.45 mL, 88 mmol, 1.05 equiv.). The thionyl chloride solution in toluene was then added to the reaction mixture. The mixture was stirred for 4 hrs and then sampled for conversion. Upon reaction completion, in a separate reactor was added compound E (19.4 g, 109 mmol, 1.3 equiv.) and DMAP (1.028 g, 8.42 mmol, 0.1 equiv.), followed by toluene (350 mL, 7 L/kg). The mixture was azeotropically distilled at 70° C. under reduced pressure to remove water. The solution was distilled down to roughly 150 mL (3 L/kg), then diluted to roughly 400 mL (8 L/kg) with dry toluene and the distillation was continued, finishing in 250 mL (5 L/kg). This solution was added to the reactor containing acid chloride in toluene at 20° C. Triethylamine was then added to the reactor (41.1 mL, 295 mmol, 3.5 equiv.). The mixture was then allowed to stir for overnight.

The mixture was sampled for conversion. Upon reaction completion, isopropanol was added (200 mL, 4 L/kg), followed by 20% brine (300 mL, 6 L/kg). The mixture was stirred vigorously for 10 min and then stirring was halted and the layers allowed to settle. The bottom layer was drained, and to the reactor was charged with 20% brine (300 mL, 6 L/kg). The mixture was stirred vigorously for 10 min and then stirring was stopped and the bottom layer was drained. The top layer was then distilled at 65° C. under reduced pressure and swapped to acetic acid. The solution was then heated to 85° C. Once temperature was reached, 65 mL of water was added with vigorous stirring in order to reach a 94:6 ratio of acetic acid/water. After addition was complete, the solution was heated back to 85° C., and the mixture was seeded with 2 wt % of compound D-seed (1.126 g) as a slurry in 90/10 acetic acid/water. The resulting slurry was aged at 85° C. before cooling to 22° C. over 5 hrs. The slurry was aged at 22° C. for ≥2 hrs and then filtered and washed using 20 mL (5 L/kg) of 90/10 acetic acid/water, followed by 750 mL water (15 L/kg). The cake was dried on the filter using vacuum and nitrogen. 52.53 g of compound D (wherein PG is Ac) obtained in 90% yield. $^1H$ NMR (400 MHz, DMSO) δ 11.74 (s, 1H), 7.63 (d, J=8.50 Hz, 1H), 7.15-7.36 (m, 4H), 6.92 (d, J=8.29 Hz, 1H), 5.67-5.81 (m, 2H), 5.03-5.25 (m, 5H), 4.04 (s, 2H), 3.77-3.88 (m, 1H), 3.37-3.49 (m, 3H), 3.28-3.37 (m, 3H), 2.66-2.82 (m, 2H), 2.29-2.42 (m, 2H), 2.01-2.13 (m, 2H), 1.95-1.90 (m, 5H), 1.77-1.85 (m, 3H), 1.50-1.74 (m, 3H), 1.24 (d, J=7.05 Hz, 3H), 1.01 (d, J=6.84 Hz, 3H). $^{13}C$ NMR (101 MHz, DMSO-$d_6$): δ 170.0, 166.4, 153.2, 141.8, 140.1, 139.5, 136.6, 135.4, 131.4, 130.0, 128.75, 126.7, 126.6, 120.8, 120.0, 117.6, 117.1, 116.0, 79.5, 77.2, 61.1, 59.6, 58.0, 42.3, 41.7, 39.5, 36.2, 31.8, 30.1, 29.0, 25.0, 21.1, 21.0, 18.8, 14.9, 8.1. LRMS (ESI): Calcd. for $C_{36}H_{45}ClN_2O_6S+Na$: 691.2, found: 691.2.

Synthesis of Compound F (Wherein PG is Ac)

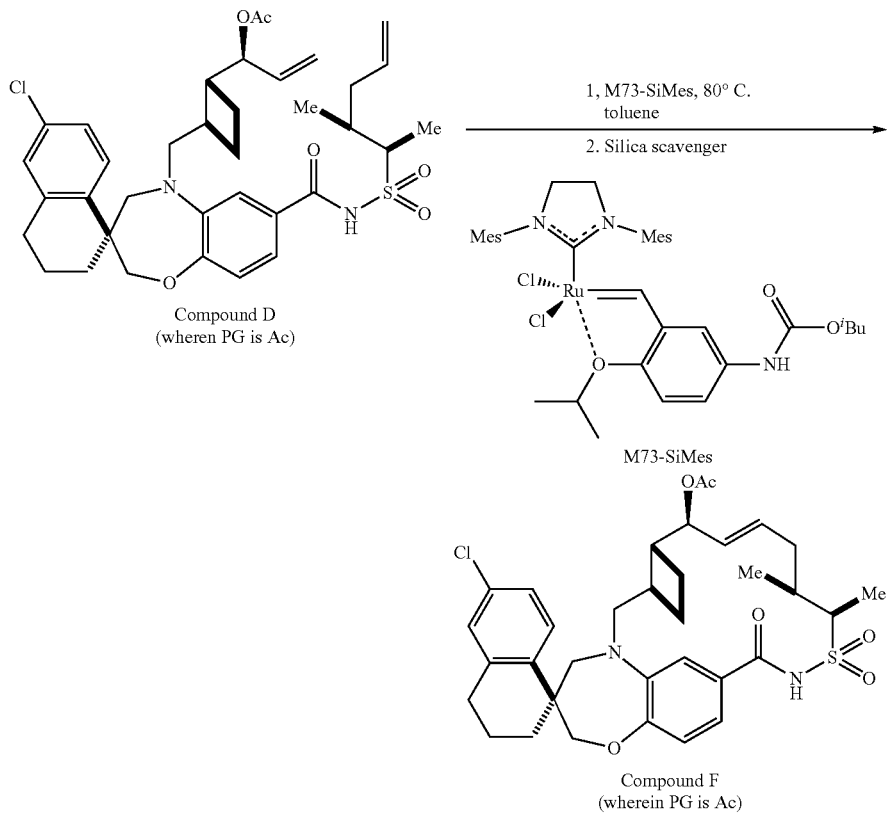

Compound D (wheren PG is Ac)

M73-SiMes

Compound F (wherein PG is Ac)

(1S,11'R,12'S,16'S,16a'R,18a'R,E)-6-chloro-11',12'-dimethyl-10',10'-dioxido-8'-oxo-3,4,8',9',12',13',16',16a',17',18',18a',19'-dodecahydro-1'H,2H,3'H,11'H-spiro[naphthalene-1,2'-[5,7]ethenocyclobuta[i][1,4]oxazepino[3,4-f][1]thia[2,7]diazacyclohexadecin]-16'-yl acetate (Compound F, wherein PG is Ac): A 20 L reactor was charged with compound D (wherein PG is Ac) (200 g) followed by toluene (3 L, 15 L/kg) and the mixture was heated to reflux and azeotropically dried with a Dean-Stark trap. Note that the starting diene was delivered to the Step 2 process as a monohydrate and it was important to remove the water and residual solvents via azeotropic distillation. The diene was then diluted to a total of 50 L/kg with toluene (10 L). A 60 L reactor was charged with 30 L of toluene (150 L/kg, charge with respect to starting compound D (wherein PG is Ac)) and heated to 80° C. A nitrogen sparge was initiated and the reactor was placed under partial vacuum (500 torr). Under these conditions, toluene condensation should be observed from the condenser. These conditions should allow efficient ethylene removal from the reaction solution. Four equivalent portions of catalyst M73-SIMes, at 1 mol % each are prepared and set aside (2.3 g each). The compound D (wherein PG is Ac) solution in toluene was added continuously to the 60 L reactor over approximately 2 h. At the beginning of substrate addition, one portion of catalyst was slurried in 50 ml (20 L/kg) of toluene with respect to catalyst and added to the reactor. The other three catalyst portions are prepared similarly and added over 30 minute intervals. Following completion of substrate addition, the reaction was stirred at 80° C. and partial vacuum for >1 h.

The reaction was cooled to 50° C. and quenched with diethyleneglycol monovinyl ether and stirred for >15 minutes at 40-50° C. The batch was then concentrated to approximately 4 L (20 L/kg) and transferred to a clean drum. The material was transferred to a 5 L reactor and 200 wt % SiliaMet-Thiol scavenger was charged (charge with respect to compound D. The mixture was stirred at 40-50° C. for >12 hours, cooled and then filtered to remove the scavenger, along with 3 washes of 400 ml toluene rinse (2 L/kg). The batch was further concentrated in a 5 L reactor to approximately 2 L total volume (10 L/kg). $^1$H NMR (600 MHz, DMSO) δ 7.66 (d, J=8.5 Hz, 1H), 7.26 (dd, J=8.5, 2.4 Hz, 1H), 7.16 (d, J=2.4 Hz, 1H), 7.05 (dd, J=8.1, 1.9 Hz, 1H), 6.86 (d, J=1.9 Hz, 1H), 6.86 (d, J=8.1 Hz, 1H), 5.86 (bddd, J=14.3, 7.9, 4.5 Hz, 1H), 5.67 (dd, J=14.3, 8.9 Hz, 1H), 5.20 (dd, J=8.9, 3.7 Hz, 1H), 4.04 (d, J=12.3 Hz, 1H), 3.99 (d, J=12.3 Hz, 1H), 3.97 (bq, J=7.2 Hz, 1H), 3.73 (d, J=14.9 Hz, 1H), 3.56 (d, J=14.2 Hz, 1H), 3.18 (d, J=14.2 Hz, 1H), 3.04 (dd, J=14.9, 10.0 Hz, 1H), 2.78 (dt, J=16.4, 3.3 Hz, 1H), 2.69 (ddd, J=16.4, 10.6, 6.2 Hz, 1H), 2.37 (bqd, J=8.2, 3.6 Hz, 1H), 2.24 (bqui, J=8.2 Hz, 1H), 2.02 (m, 2H), 1.97 (dt, J=14.2, 3.6 Hz, 1H), 1.93 (s, 3H), 1.89 (m, 1H), 1.89 (m, 1H), 1.83 (m, 2H), 1.72 (m, 1H), 1.72 (m, 1H), 1.38 (ddd, J=14.2, 12.7, 3.9 Hz, 1H), 1.25 (d, J=7.2 Hz, 3H), 0.92 (d, J=6.8 Hz, 3H). $^{13}$C NMR (150 MHz, DMSO) δ 169.2, 168.6, 151.2, 139.8, 139.6, 139.4, 135.5, 130.8, 129.6, 129.0, 128.1, 126.3, 125.3, 119.5, 118.0, 114.7, 79.7, 74.6, 59.8, 57.2, 55.6, 41.3, 40.8, 36.4, 32.8, 32.6, 29.5, 27.7, 26.2, 21.1, 18.9, 18.4, 15.1, 5.5. LRMS (ESI): Calcd. for $C_{34}H_{41}ClN_2O_6S$+Na: 663.2, found: 663.2.

Synthesis of Compound A

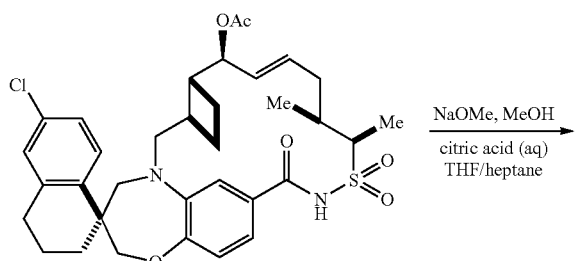

Compound F
(wherein PG is Ac)

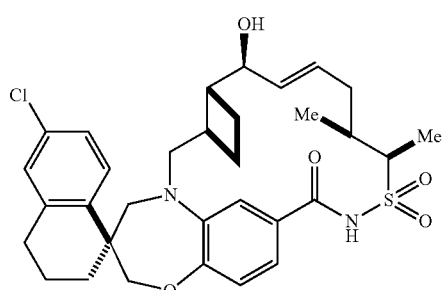

Compound A (1S,11'R,12'S,16'S,16a'R,18a'R,E)-6-chloro-16'-hydroxy-11',12'-dimethyl-3,4,12',13',16',16a',17',18',18a',19'-decahydro-1'H,2H,3'H,11'H-spiro[naphthalene-1,2'-[5,7]ethenocyclobuta[i][1,4]oxazepino[3,4-f][1]thia[2,7]diazacyclohexadecin]-8'(9'H)-one 10',10'-dioxide (Compound A): A solution of 200 g of compound F (wherein PG is Ac) in 10 L/kg of MeOH was charged with sodium methoxide (2 equiv.) in methanol, diluted with 1 volume of MeOH (followed by 1V MeOH rinse) and stirred for >2 hours at 20° C. The batch was warmed to 40-50° C. and 2 L (10 L/kg) toluene are added. 4M citric acid (3.0 equiv.), further diluted with 4 volumes of water was charged and the phases are stirred vigorously at 40-50° C. for >15 minutes. Note that efficient mixing and elevated temperature (40-50° C.) was necessary to minimize precipitation of product as an amorphous solid. The phases are separated at 40-50° C., and any solids at the interface of the aqueous and organic layers were kept with the organic layer. The organics were diluted with an additional 1 L (5 L/kg) MeOH and washed with an additional 5 volumes of water at 40-50° C. for >15 minutes. The phases were separated at 40-50° C., and any solids at the interface of the aqueous and organic layers were kept with the organic layer. The mixture was stirred vigorously for >5 min. The batch, post workup, was then concentrated to approximately 1 L (5 L/kg), chased with an additional 1.2 L (6 L/kg) of toluene and further concentrated to 1 L (5 L/kg) total and diluted with an additional 1.2 L (6 L/kg) of toluene. This mixture was then polish filtered again to remove salts (followed by a 400 ml (2 L/kg) toluene rinse of the filter). The batch was then concentrated to approximately 1 L (5 L/kg). Tetrahydrofuran was then charged (1 L/kg) followed by seeding. The seed bed was aged for >1 hour at 40-50° C. and an additional 2 L/kg of THF was added over 1 hour. The batch was then cooled to 20° C. over at least 2 hours. Heptane (6 L/kg) was added over >2 hours and the mixture was aged for at least 1 hr. The resulting cake was then washed with 2×2 L/kg of 2:1 heptane:THF and dried to constant weight. $^1$H NMR (600 MHz, CDCl$_3$) δ 8.53 (s, 1H), 7.70 (d, J=8.6 Hz, 1H), 7.17 (dd, J=8.6, 2.4 Hz, 1H), 7.09 (d, J=2.4 Hz, 1H), 7.00 (dd, J=8.1, 2.0 Hz, 1H), 6.96 (d, J=2.0 Hz, 1H), 6.94 (d, J=8.1 Hz, 1H), 5.85 (ddd, J=15.3, 8.4, 4.6 Hz, 1H), 5.72 (ddd, J=15.3, 8.1, 1.6 Hz, 1H), 4.28 (qd, J=7.2, 1.3 Hz, 1H), 4.25 (dd, J=8.1, 4.0 Hz, 1H), 4.09 (d, J=12.1 Hz, 1H), 4.07 (d, J=12.1 Hz, 1H), 3.84 (bd, J=14.8 Hz, 1H), 3.69 (d, J=14.1 Hz, 1H), 3.23 (d, J=14.1 Hz, 1H), 3.01 (dd, J=14.8, 9.6 Hz, 1H), 2.83-2.77 (m, 1H), 2.77-2.72 (m, 1H), 2.44 (qd, J=9.6, 4.0 Hz, 1H), 2.32 (quid, J=9.6, 1.6 Hz, 1H), 2.14-2.04 (m, 2H), 2.05-1.98 (m, 3H), 1.98-1.92 (m, 1H), 1.88 (bq, J=10.4 Hz, 1H), 1.85-1.75 (m, 2H), 1.66 (qui, J=9.6 Hz, 1H), 1.47 (d, J=7.2 Hz, 3H), 1.39 (bt, J=12.8 Hz, 1H), 1.04 (d, J=6.7 Hz, 3H); $^{13}$C NMR (151 MHz, CDCl$_3$) δ 166.5, 152.9, 140.9, 139.3, 138.8, 132.2, 132.1, 130.8, 129.6, 128.5, 126.7, 126.3, 120.9, 116.2, 115.2, 80.1, 73.3, 59.9, 58.2, 57.8, 43.6, 41.7, 37.1, 33.7, 33.6, 30.1, 28.3, 27.1, 19.2, 19.1, 15.3, 5.7. LRMS (ESI): Calcd. for $C_{32}H_{39}ClN_2O_5S$+Na: 621.2, found: 621.2.

Example 2: Formation of Compound A with 4-bromobenzoyl PG

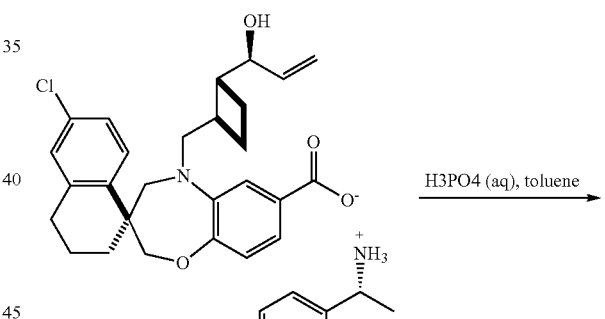

Compound B'

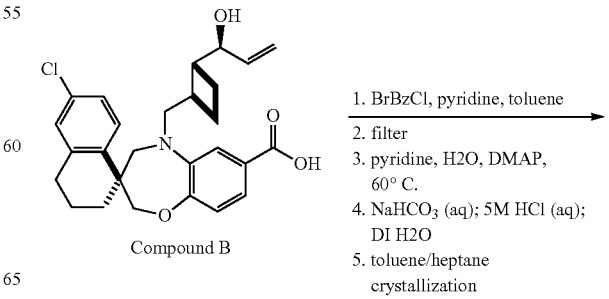

Compound B

1. BrBzCl, pyridine, toluene
2. filter
3. pyridine, H2O, DMAP, 60° C.
4. NaHCO$_3$ (aq); 5M HCl (aq); DI H2O
5. toluene/heptane crystallization 43
-continued

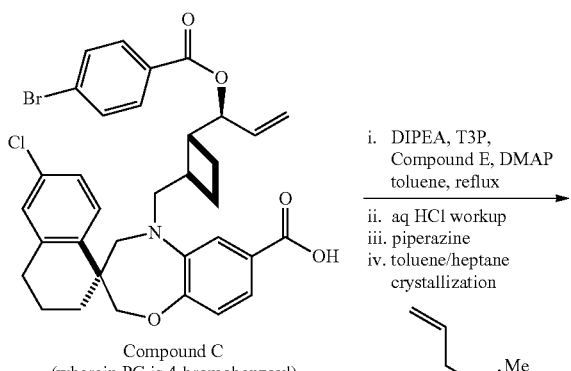

Compound C
(wherein PG is 4-bromobenzoyl)

i. DIPEA, T3P, Compound E, DMAP toluene, reflux
ii. aq HCl workup
iii. piperazine
iv. toluene/heptane crystallization Compound E

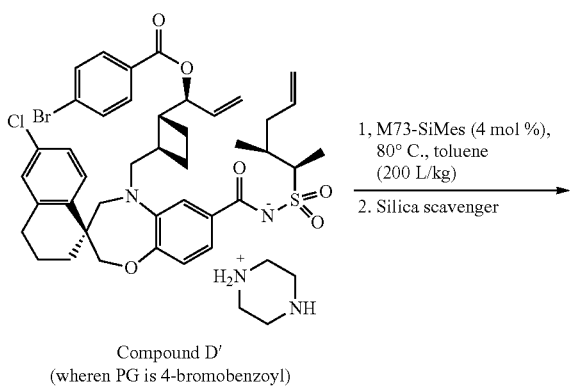

Compound D'
(wheren PG is 4-bromobenzoyl)

1, M73-SiMes (4 mol %), 80° C., toluene (200 L/kg)
2. Silica scavenger

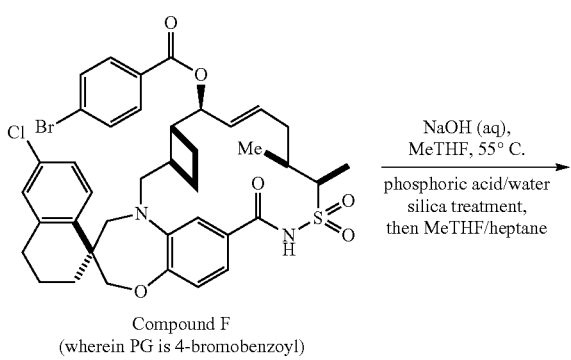

Compound F
(wherein PG is 4-bromobenzoyl)

NaOH (aq), MeTHF, 55° C.
phosphoric acid/water silica treatment, then MeTHF/heptane

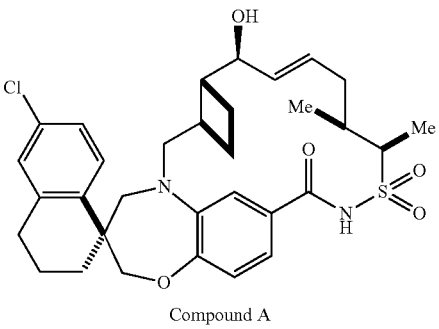

Compound A

44
Synthesis of Compound C (Wherein PG is 4-bromobenzoyl)

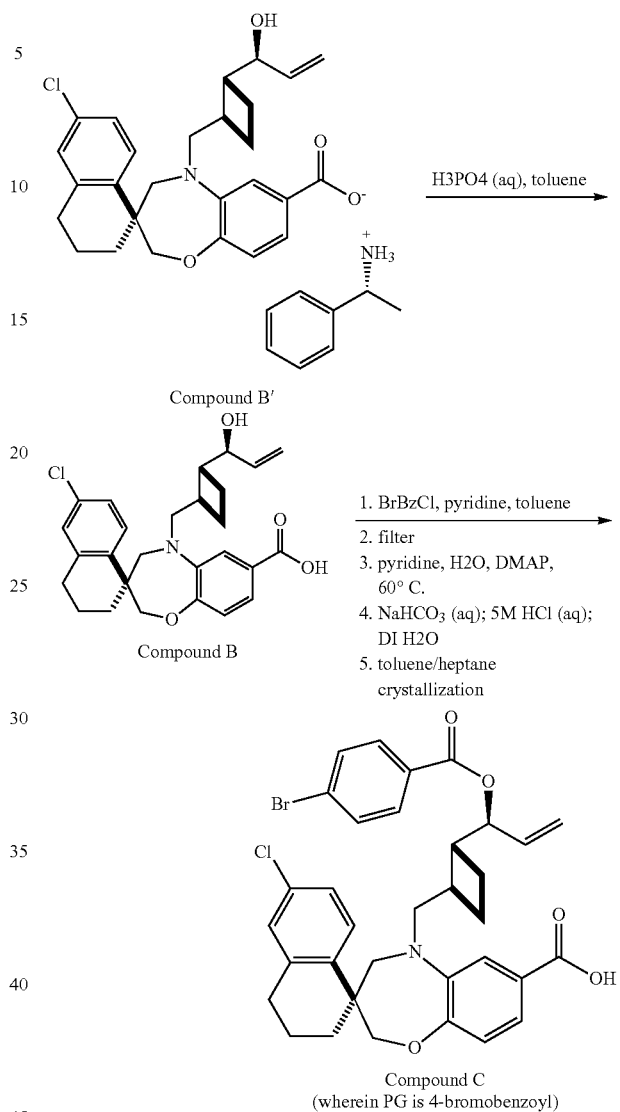

(S)-5-(((1R,2R)-2-((S)-1-((4bromobenzoyl)oxy)allyl)cyclobutyl)methyl)-6'-chloro-3',4,4',5-tetrahydro-2H,2'H-spiro[benzo[b][1,4]oxazepine-3,1'-naphthalene]-7-carboxylic acid (Compound C, wherein PG is 4-bromobenzoyl): To a 5 L glass lined, jacketed reactor was charged 143 g of compound B' (243 mmol), followed by toluene (15 L/kg). To the resultant slurry was charged 1M $H_3PO_4$ (aq) (4 L/kg). The mixture was agitated for 60 minutes at 20° C., and the agitation was then stopped and the layers allowed to settle. The bottom aqueous layer was drained, and to the toluene mixture was charged with DI water (5 L/kg). The mixture was agitated for at least 5 minutes at 20° C. and then the agitation was stopped and the layers separated. The bottom layer was drained, and to the reactor was charged DI water (5 L/kg). The mixture was agitated for at least 5 minutes and then agitation was stopped and the bottom layer was drained. The organic mixture was distilled to a concentration of 5 L/kg. After confirming $H_2O$ to be ≤500 ppm, the mixture was diluted with toluene (6.25 L/kg) and cooled to 25° C. 4-Bromobenzoyl chloride was then charged (3.0 equiv., 146 g, 729 mmol), followed by a rinse with toluene. Pyridine was then charged (10 equiv., 2430 mmol, 192 g), and the mixture was agitated at 25-30° C. for at least 12 hours. After confirming that the reaction was complete by UPLC, the slurry was filtered to remove bromo-benzoic anhydride and rinsed with toluene. To the toluene solution was charged water (10 L/kg), followed by DMAP (2.0 equiv., 486 mmol, 59 g) and pyridine (5.0 equiv., 1215 mmol, 96 g). The biphasic mixture was agitated at 60° C. for at least 7 hours. After this time, the agitation was stopped, and the top layer was sampled for conversion. After confirming the hydrolysis to be complete, the mixture was cooled to 50° C. and the layers were separated. The organic layer was washed with sat. aq. NaHCO$_3$ solution (5 L/kg) at 50° C. The layers were separated, and then to the toluene was charged 5M HCl (aq) (6 L/kg). The mixture was agitated and the layers were separated, and the organic layer was washed a final time with DI water (5 L/kg). The toluene layer was distilled to 4 L/kg and then cooled to 20° C. The mixture was then seeded with compound C (wherein PG is 4-bromobenzoyl). The resultant slurry was aged for at least 2 hours at 20° C., followed by the addition of 9 L/kg of n-heptane. The slurry was cooled to 0° C., aged for 2 hours and then filtered and washed with toluene/heptane. The product cake was dried at 25-40° C. Isolated yield: 75%. $^1$H NMR (600 MHz, CDCl$_3$) δ 7.86 (d, J=8.6 Hz, 2H), 7.64 (d, J=8.5 Hz, 1H), 7.50 (d, J=8.6 Hz, 2H), 7.47 (dd, J=8.2, 1.9 Hz, 1H), 7.44 (d, J=1.9 Hz, 1H), 7.16 (dd, J=8.5, 2.3 Hz, 1H), 7.08 (d, J=2.3 Hz, 1H), 6.93 (d, J=8.2 Hz, 1H), 5.84 (ddd, J=17.1, 10.6, 6.4 Hz, 1H), 5.49 (bt, J=6.4 Hz, 1H), 5.36 (dt, J=17.1, 1.2 Hz, 1H), 5.22 (dt, J=10.6, 1.2 Hz, 1H), 4.12 (d, J=12.1 Hz, 1H), 4.08 (d, J=12.1 Hz, 1H), 3.59 (dd, J=14.8, 4.1 Hz, 1H), 3.52 (d, J=14.4 Hz, 1H), 3.35 (dd, J=14.8, 9.0 Hz, 2H), 3.32 (d, J=14.4 Hz, 1H), 2.78-2.75 (m, 1H), 2.75-2.71 (m, 2H), 2.47 (qui, J=8.5 Hz, 1H), 2.12-2.02 (m, 1H), 2.00-1.92 (m, 1H), 1.93-1.85 (m, 2H), 1.85-1.77 (m, 1H), 1.78-1.69 (m, 2H), 1.56 (bt, J=11.0 Hz, 1H); $^{13}$C NMR (151 MHz, CDCl$_3$) δ 171.8, 165.1, 153.7, 141.0, 139.0, 138.8, 134.3, 132.1, 131.7, 131.0, 129.5, 129.1, 128.6, 128.1, 126.6, 123.7, 121.7, 120.8, 117.5, 117.0, 79.4, 78.0, 60.9, 58.8, 43.0, 41.8, 36.2, 30.2, 29.0, 25.9, 21.2, 19.0. LRMS (ESI): Calcd. for $C_{34}H_{33}BrClNO_5$+Na: 672.1, found: 672.1.

Synthesis of Compound D (Wherein PG is 4-Bromobenzoyl)

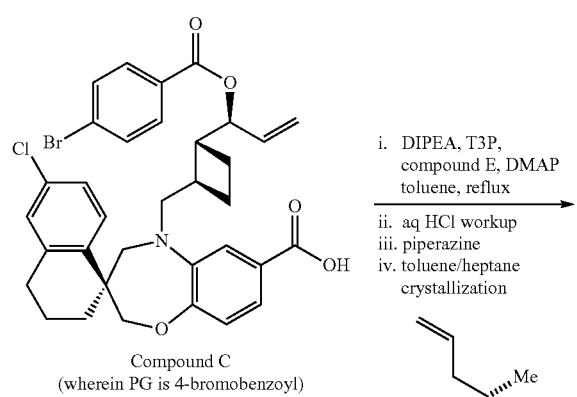

Compound C
(wherein PG is 4-bromobenzoyl)

i. DIPEA, T3P, compound E, DMAP toluene, reflux
ii. aq HCl workup
iii. piperazine
iv. toluene/heptane crystallization Compound E -continued

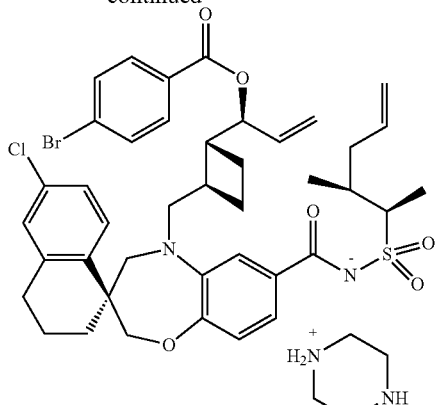

Compound D piperazine salt
(wheren PG is 4-bromobenzoyl)

((S)-5-(((1R,2R)-2-((S)-1-((4-bromobenzoyl)oxy)allyl)cyclobutyl)methyl)-6'-chloro-3',4,4',5-tetrahydro-2H,2'H-spiro[benzo[b][1,4]oxazepine-3,1'-naphthalene]-7-carbonyl)(((2R,3S)-3-methylhex-5-en-2-yl)sulfonyl)amide piperazine salt (Compound D, piperazine salt): A flask was charged with compound C (PG is 4-bromobenzoyl (10 g, 85 wt %, 13.2 mmol)), toluene (50 mL) and DIPEA (6.0 mL, 3.5 equiv.). To the homogenous solution was added 50 wt % T3P in toluene (13.6 mL, 1.5 equiv.), compound E (2.6 g, 1.1 equiv.) and DMAP (1.6 g, 1.0 equiv.). The resulting mixture was then heated to reflux overnight. The reaction was cooled to room temperature and quenched with 1M aq HCl (50 mL), the aqueous layer was separated and the organic layer was washed twice with 1M aq HCl (50 mL) and once with water (50 mL). The organic layer was polish filtered, washed with toluene (50 mL) and concentrated to approx. 50 mL. Piperazine (1.14 g, 1.0 equiv.) was charged to the toluene solution and the mixture was stirred at 60° C. for 1 hour. The solution was cooled to room temperature and compound D piperazine salt seed was charged into the mixture. The slurry was stirred and heptane (22 mL) was charged into the mixture. Upon complete addition, the slurry was warmed to 50° C. and additional heptane (21 mL) was charged into the mixture. The slurry was cooled to room temperature, filtered and the cake washed twice with 1:1 toluene/heptane (50 mL) and dried to deliver compound D piperazine salt as an off-white crystalline solid (11.4 g, 85 wt %, 82% yield): $^1$H NMR (600 MHz, DMSO-d$_6$): δ 7.79 (d, 8.6 Hz, 2H), 7.67 (d, 8.6 Hz, 2H), 7.53 (d, 1.9 Hz, 1H), 7.48 (d, 8.5 Hz, 1H), 7.31 (dd, 8.2, 1.9 Hz, 1H), 7.14 (dd, 8.5, 2.4 Hz, 1H), 7.12 (d, 2.4 Hz, 1H), 6.76 (d, 8.2 Hz, 1H), 5.86 (ddd, 17.2, 10.7, 6.4 Hz, 1H), 5.71 (ddt, 17.1, 10.2, 7.0 Hz, 1H), 5.41 (bt, 6.4 Hz, 1H), 5.27 (dt, 17.2, 1.4 Hz, 1H), 5.15 (dt, 10.7, 1.4 Hz, 1H), 5.00 (dq, 17.1, 1.5 Hz, 1H), 4.95 (ddt, 10.2, 2.4, 1.5 Hz, 1H), 3.95 (d, 12.0 Hz, 1H), 3.87 (d, 12.0 Hz, 1H), 3.38 (dd, 14.2, 8.0 Hz, 1H), 3.37 (qd, 7.1, 2.6 Hz, 1H), 3.30 (dd, 14.2, 5.5 Hz, 1H), 3.20 (d, 14.1 Hz, 1H), 3.15 (d, 14.1 Hz, 1H), 2.90 (s, 8H), 2.66 (bt, 6.4 Hz, 2H), 2.59 (td, 8.0, 5.5 Hz, 1H), 2.49 (qui, 8.0 Hz, 1H), 2.34 (sxtd, 7.0, 2.6 Hz, 1H), 1.97 (m, 3H), 1.85 (m, 2H), 1.73 (m, 2H), 1.66 (m, 2H), 1.55 (ddd, 13.5, 9.8, 4.0 Hz, 1H), 1.08 (d, 7.1 Hz, 3H), 0.94 (d, 7.0 Hz, 3H); $^{13}$C NMR (150 MHz, DMOS-d$_6$): δ 169.8, 164.4, 150.9, 140.7, 139.6, 138.8, 137.3, 134.6, 134.4, 131.9, 131.0, 130.7, 129.4, 128.8, 128.2, 127.3, 125.9, 119.8, 119.5, 117.2, 116.4, 116.0, 78.7, 77.6, 61.2, 58.2, 57.2, 43.2, 42.3, 41.4, 40.0, 35.8, 31.4, 29.6, 28.5, 24.2, 20.2, 18.2, 14.5, 8.4; LRMS (ESI): Calcd. for $C_{41}H_{46}BrClN_2O_6S+Na$: 831.2, found: 831.2.

Synthesis of Compound F (Wherein PG is 4-Bromobenzoyl)

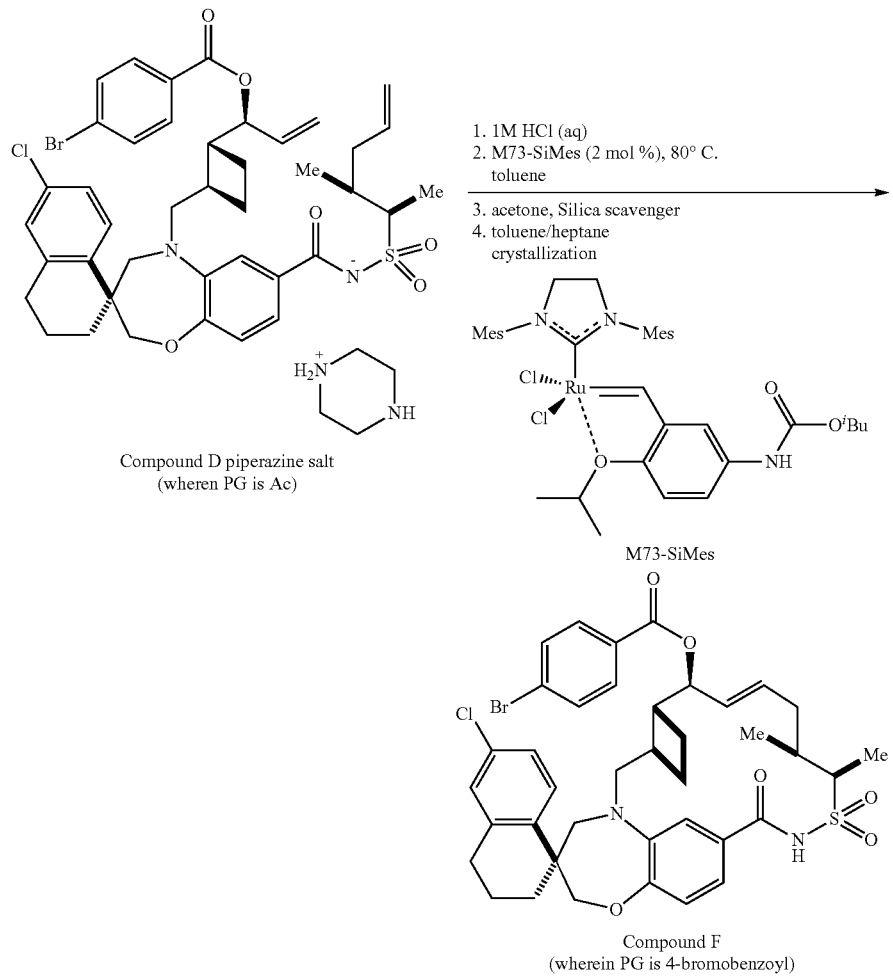

(1S,11'R,12'S,16'S,16a'R,18a'R,E)-16'-((4-bromobenzyl) oxy)-6-chloro-11',12'-dimethyl-3,4,12',13',16',16a',17',18', 18a',19'-decahydro-1'H,2H,3'H,11'H-spiro[naphthalene-1, 2'-[5,7]ethenocyclobuta[i][1,4]oxazepino[3,4-f][1]thia[2,7] diazacyclohexadecin]-8'(9'H)-one 10',10'-dioxide (Compound F wherein PG is 4-bromobenzoyl): In a jacketed vessel, compound D piperazine salt (70 g) was stirred in toluene (1.4 L, 20 L/kg) in the presence of an aqueous HCl 1N solution (0.35 L) at room temperature for 1 hour. Upon separation of the layers, the organic layer was washed two more times with HCl 1 N (2×0.35 L, 10 L/kg) for complete removal of residual piperazine. The resulting organic layer was washed twice with deionized water (2×0.35 L, 10 L/kg). The organic layer with the free form of compound D was concentrated under vacuum until 700 mL was reached. In a second vessel, the solution of catalyst M73-SIMes (1.287 g, 1.734 mmol, 0.022 equiv.) was prepared in dichloromethane (0.35 L, 5 g/mL) and toluene mixture (0.35 L, 5 g/mL). In a third large vessel equipped with a condenser, toluene (2.80 L, 40 L/kg) was charged and heated to 75-85° C. (target 80° C.), then a controlled vacuum was set to an internal pressure of 300-500 torr. The catalyst solution and compound D toluenic solution were simultaneously charged over 60-90 minutes to the vessel containing toluene at 80° C. under 300-500 torr pressure. After addition completed, the solution was stirred for 1 hour before sampling for conversion. Upon completion of the reaction (Monitored by LC), the batch was pressurized to 1 atm with a flow of nitrogen and cooled down to 45° C. Diethyleneglycol monovinylether (256 uL, 1.874 mmol, 0.024 equiv.) was added to quench the remaining active catalyst. After 1 hour, the batch was distilled under vacuum to approximately 700 mL of toluene. The mixture was then cooled to room temperature and diluted with acetone (0.7 L, 10 L/kg) to reach a 1:1 toluene/acetone solution. Silia-MetS-Thiol scavenger (35.0 g) was then charged into the mixture, and the slurry was warmed to 50° C. with agitation to scavenge ruthenium metal. After 16 hours of stirring, the batch was filtered and the spent silica was washed twice with 1:1 toluene/acetone (2×0.63 L, 18 L/kg). Filtrate and washes were combined and concentrated under vacuum to reduce the total volume to approximately 700 mL. The batch was held at 45° C. during 2 hours to induce self-seeding. Heptane (0.28 L, 4 L/kg) was dosed into the slurry at 45° C. over 3 hours, followed by a progressive cool down to 20-25° C. The slurry was filtered under vacuum and the cake was washed twice with 2:1 toluene: heptane (2×0.21 L, 6 L/kg). The solid was dried under vacuum at 40° C. to provide compound F, wherein PG is 4-bromobenzoyl as a white solid (48.9 g, 80-85% yield). $^1$H NMR (600 MHz, CDCl$_3$) b 8.46 (s, 1H), 7.71 (d, J=8.6 Hz, 2H), 7.56 (d, J=8.5 Hz, 2H), 7.54 (d, J=8.7 Hz, 1H), 7.16 (dd, J=8.7, 2.3 Hz, 1H), 7.10 (d, J=2.0 Hz, 1H), 7.07 (d, J=2.3 Hz, 1H), 7.01 (dd, J=8.1, 2.0 Hz, 1H), 6.95 (d, J=8.1 Hz, 1H), 5.97 (ddd, J=15.2, 9.1, 4.4 Hz, 1H), 5.73 (ddt, J=15.2, 8.2, 1.4 Hz, 1H), 5.59 (dd, J=8.2, 4.8 Hz, 1H), 4.30 (qd, J=7.3, 1.2 Hz, 1H), 4.08 (d, J=12.4 Hz, 1H), 4.06 (d, J=12.4 Hz, 1H), 3.97 (dd, J=15.5, 3.2 Hz, 1H), 3.57 (d, J=14.4 Hz, 1H), 3.17 (d, J=14.4 Hz, 1H), 3.03 (dd, J=15.5, 9.1 Hz, 1H), 2.81-2.76 (m, 1H), 2.77-2.72 (m, 1H), 2.67 (qd, J=9.2, 4.7 Hz, 1H), 2.46 (quid, J=9.1, 3.2 Hz, 1H), 2.14-2.04 (m, 3H), 2.04-1.99 (m, 2H), 2.00-1.88 (m, 3H), 1.85-1.74 (m, 1H), 1.69 (dq, J=10.6, 9.1 Hz, 1H), 1.45 (d, J=7.3 Hz, 3H), 1.38 (tt, J=13.2, 2.3 Hz, 1H), 1.02 (d, J=6.7 Hz, 3H). $^{13}$C NMR (151 MHz, CDCl$_3$) δ 166.5, 164.8, 152.8, 140.8, 139.3, 138.7, 134.2, 132.2, 131.7, 131.1, 129.6, 129.4, 128.5, 127.9, 126.7, 126.4, 126.3, 120.9, 116.0, 115.7, 80.2, 75.9, 59.4, 58.1, 57.8, 41.7, 37.5, 33.7, 33.4, 30.1, 28.2, 26.6, 19.8, 19.0, 15.4, 5.9. LRMS (ESI): Calcd. for C$_{39}$H$_{42}$BrClN$_2$O$_6$S+Na: 803.1, found: 803.1.

Continuous Manufacture: Synthesis of Compound F (Wherein PG is 4-Bromobenzoyl)

18a',19'-decahydro-1'H,2H,3'H,11'H-spiro[naphthalene-1, 2'-[5,7]ethenocyclobuta[i][1,4]oxazepino[3,4-f][1]thia[2,7] diazacyclohexadecin]-8'(9'H)-one 10',10'-dioxide Compound F (wherein PG is 4-bromobenzoyl): Stage 1 of a 2-stage Continuous Stirred-Tank Reactor (CSTR) was connected to two input feeds. Stage 1 and 2 CSTR's were each linked to a nitrogen gas sweep. To both CSTR's were charged 50 mL of toluene, and both CSTR's were set to an internal temperature of 90-95° C. Both CSTR's were equipped with a condenser chilled at 1° C. The stage 1 and 2 CSTR's were linked together using a third pump, set to a 1.0 mL/min flow rate. The Stage 2 CSTR to crude collection vessel was linked using a fourth pump, set to a 1.0 mL/min flow rate. Compound D-Free form (2.11 grams, made from 2.46 g of Piperazine salt-break) dissolved into toluene (100 mL, 40 L/kg) (feed 1) was pumped at 0.50 mL/min flow rate using a peristaltic pump 1 into CSTR 1. M73-SiMes catalyst (40.7 mg, 2.0 mol %) dissolved into toluene (100 mL) (feed 2), was pumped at 0.50 mL/min flow rate using peristaltic pump 2 into CSTR 1. Both pump feeds were initiated at the same time. Feed 1 & 2 reagent bottles were kept at 25° C., under a nitrogen gas feed. After pumping the reaction streams, the solution entering the collection vessel was

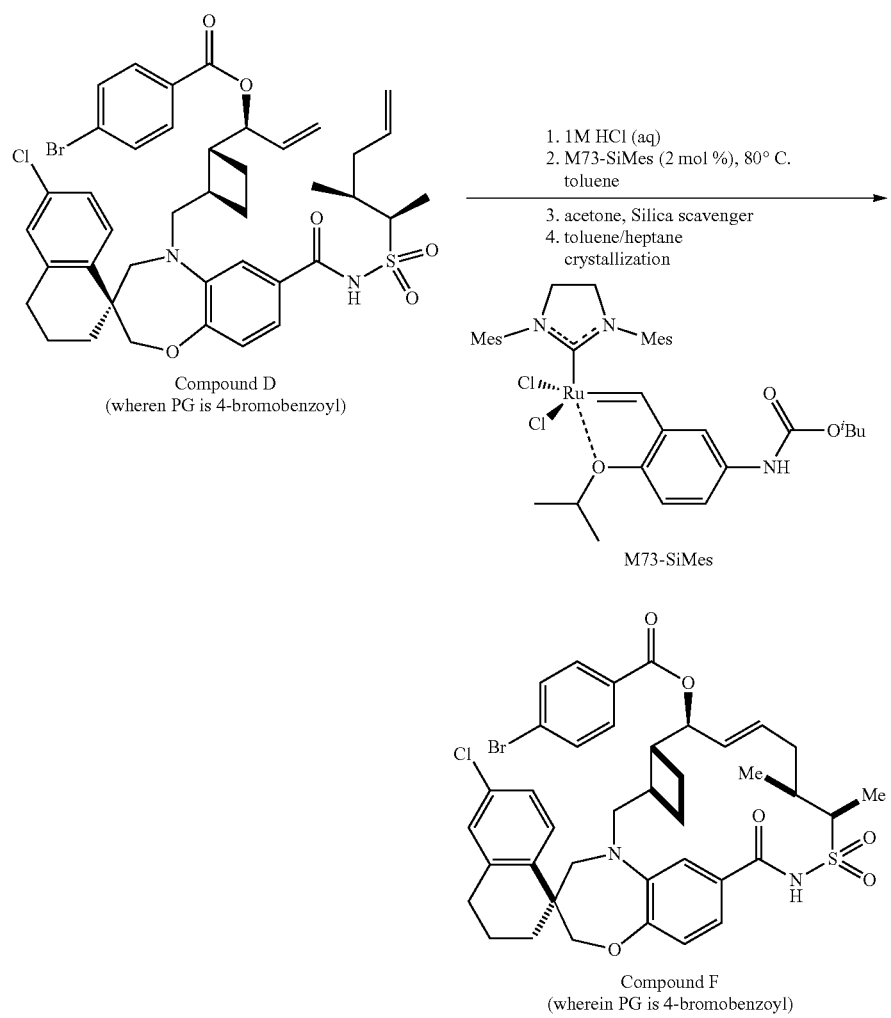

(1S,11'R,12'S,16'S,16a'R,18a'R,E)-16'-((4-bromobenzyl) oxy)-6-chloro-11',12'-dimethyl-3,4,12',13',16',16a',17',18, collected in fractions, every 35 minutes, over 3.33 hours of process time. After 140 minutes of pumping, the fractions were analyzed by liquid chromatography (LC) to assess conversion. Results: LC purity (PenumBrBz)=86.18%. LC purity (RCMPRE)=2.32%.

Synthesis of Compound A

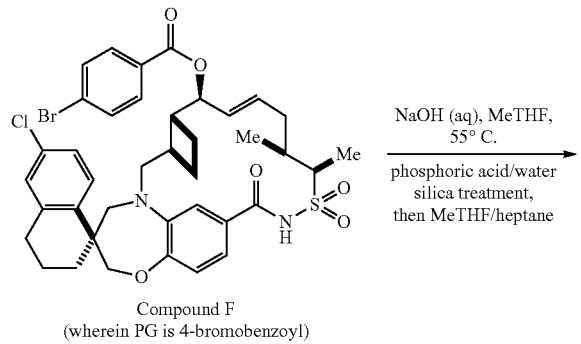

Compound F
(wherein PG is 4-bromobenzoyl)

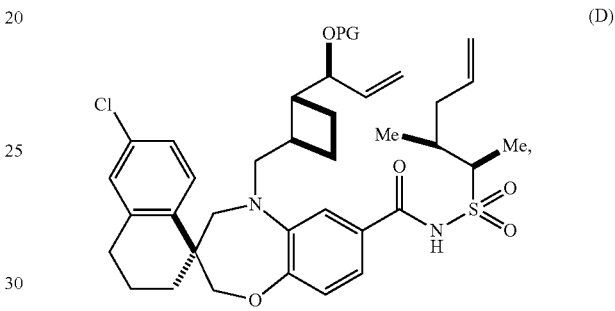

Compound A (1S,11'R,12'S,16'S,16a'R,18a'R,E)-6-chloro-16'-hydroxy-11',12'-dimethyl-3,4,12',13',16',16a',17',18',18a',19'-decahydro-1'H,2H,3'H,11'H-spiro[naphthalene-1,2'-[5,7]ethenocyclobuta[i][1,4]oxazepino[3,4-f][1]thia[2,7]diazacyclohexadecin]-8'(9'H)-one 10',10'-dioxide (Compound A): To a 2 L glass jacketed reactor was charged compound F (PG was 4-bromobenzoyl (60 g, 76.7 mmol)), followed by 600 ml of 2-MeTHF (10 L/kg). The resulting mixture was stirred at 20° C. for 30 min. To the reactor was then charged 5M NaOH (92.05 ml, 6 equiv.) with stirring. The reaction was stirred at 55° C. for 5 hours. To the reaction mixture was charged 1200 ml 2MeTHF (20 L/kg), followed by 276 ml (4.6 L/kg, 9 equiv.) of 2.5 M $H_3PO_4$ at 50° C. and stirred at 50° C. for 10 minutes. The aqueous phase was removed after phase separation. To the reactor containing the organic phase was then charged 300 ml of water (5 L/kg) at 50° C. and the resulting mixture was stirred at 50° C. for 10 minutes. The aqueous phase was removed after phase separation. The water wash was repeated one more time. 100 w/w % SiliaMet-Thiol was then added, and the mixture was stirred at 20-45° C. for 18 hours. The mixture was then filtered and washed with 2-MeTHF. The batch was then concentrated under reduced pressure to 9 L/kg (540 ml) of the batch. The batch was cooled to 45° C. and held for 1 hr to induce self-seeding. The resultant suspension was then cooled to 20° C., and to the reactor was charged 450 ml of heptane (7.5 L/kg). After addition, the suspension was stirred at 20° C. over one hour. A white crystalline solid (compound A) was obtained after filtration and washing with 1/1 mixture of 2-MeTHF/heptane. $^1$H NMR (600 MHz, CDCl$_3$) δ 8.53 (s, 1H), 7.70 (d, J=8.6 Hz, 1H), 7.17 (dd, J=8.6, 2.4 Hz, 1H), 7.09 (d, J=2.4 Hz, 1H), 7.00 (dd, J=8.1, 2.0 Hz, 1H), 6.96 (d, J=2.0 Hz, 1H), 6.94 (d, J=8.1 Hz, 1H), 5.85 (ddd, J=15.3, 8.4, 4.6 Hz, 1H), 5.72 (ddd, J=15.3, 8.1, 1.6 Hz, 1H), 4.28 (qd, J=7.2, 1.3 Hz, 1H), 4.25 (dd, J=8.1, 4.0 Hz, 1H), 4.09 (d, J=12.1 Hz, 1H), 4.07 (d, J=12.1 Hz, 1H), 3.84 (bd, J=14.8 Hz, 1H), 3.69 (d, J=14.1 Hz, 1H), 3.23 (d, J=14.1 Hz, 1H), 3.01 (dd, J=14.8, 9.6 Hz, 1H), 2.83-2.77 (m, 1H), 2.77-2.72 (m, 1H), 2.44 (qd, J=9.6, 4.0 Hz, 1H), 2.32 (quid, J=9.6, 1.6 Hz, 1H), 2.14-2.04 (m, 2H), 2.05-1.98 (m, 3H), 1.98-1.92 (m, 1H), 1.88 (bq, J=10.4 Hz, 1H), 1.85-1.75 (m, 2H), 1.66 (qui, J=9.6 Hz, 1H), 1.47 (d, J=7.2 Hz, 3H), 1.39 (bt, J=12.8 Hz, 1H), 1.04 (d, J=6.7 Hz, 3H); $^{13}$C NMR (151 MHz, CDCl$_3$) δ 166.5, 152.9, 140.9, 139.3, 138.8, 132.2, 132.1, 130.8, 129.6, 128.5, 126.7, 126.3, 120.9, 116.2, 115.2, 80.1, 73.3, 59.9, 58.2, 57.8, 43.6, 41.7, 37.1, 33.7, 33.6, 30.1, 28.3, 27.1, 19.2, 19.1, 15.3, 5.7. LRMS (ESI): Calcd. for $C_{32}H_{39}ClN_2O_5S$+Na: 621.2, found: 621.2.

What is claimed is:

1. A compound having a structure of compound D:

(D)

or a salt or solvate thereof, wherein PG is an alcohol protecting group.

2. The compound of claim 1, wherein the PG forms an ether, a silyl ether, an acetal or ketal, or an acyl.

3. The compound of claim 2, wherein the PG is an acyl.

4. The compound of claim 3, wherein the acyl is acetyl, pivaloyl, benzoyl (Bz), 4-bromobenzoyl (Br-Bz), 4-chlorobenzoyl, 4-iodobenzoyl, 4-fluorobenzoyl, 4-nitrobenzoyl, 4-phenylbenzoyl, 1-naphthoyl, or 2-naphthoyl.

5. The compound of claim 4, wherein PG is acetyl.

6. The compound of claim 4, wherein PG is pivaloyl.

7. The compound of claim 4, wherein PG is benzoyl, 4-bromobenzoyl, 4-nitrobenzoyl, 4-phenylbenzoyl, 1-naphthoyl, or 2-naphthoyl.

8. The compound of claim 7, wherein PG is 4-bromobenzoyl.

9. The compound of claim 2, wherein PG forms an ether.

10. The compound of claim 9, wherein the ether is methoxy, ethoxy, propoxy, butoxy, methoxymethyl acetal (MOM), 2-methyoxyethoxymethyl ester (MEM), ethoxyethyl acetal (EE), methoxypropyl ether (MOP), benzyloxymethyl acetal (BOM), benzyl ether (Bn), 4-methoxybenzyl ether (PMB), or 2-naphthylmethyl ether (Nap).

11. The compound of claim 2, wherein PG forms an acetal or ketal.

12. The compound of claim 11, wherein PG forms tetrahydropyranyl acetal (THP).

13. The compound of claim 2, wherein PG forms a silyl ether.

14. The compound of claim 13, wherein PG forms triethylsilyl ether (TES), triisopropylsilyl ether (TIPS), trimethylsilyl ether (TMS), tert-butyldimethylsilyl ether (TBS), or tert-butyldiphenylsilyl ether (TBDPS).

15. A process for synthesizing compound D, or a salt or solvate thereof:

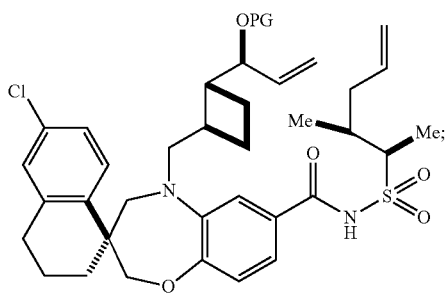

comprising:
admixing compound C, an activating agent, an amine base, and Compound E in the presence of a solvent to form compound D or a salt or solvate thereof

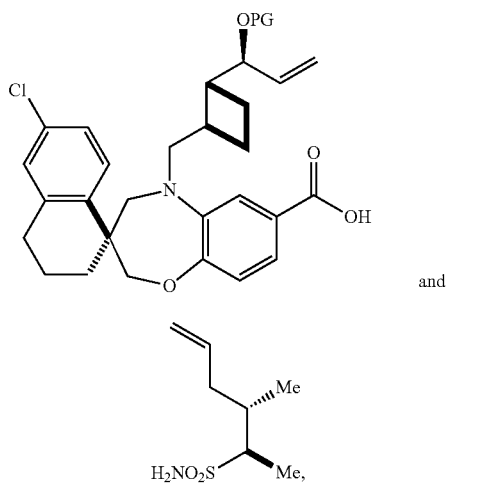

wherein PG is an alcohol protecting group.

16. The process of claim 15, further comprising synthesizing compound C by admixing compound B and a protecting group reagent to form compound C:

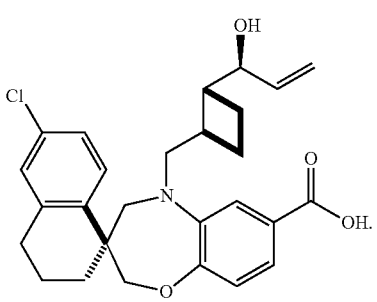

17. The process of claim 16, wherein compound B and the protecting group reagent are admixed with a base.

18. The process of claim 17, wherein the base comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), NaH, KH, $K_2CO_3$, $Na_2CO_3$, $Li_2CO_3$, $Cs_2CO_3$, or a combination thereof.

19. The process of claim 18, wherein the base comprises pyridine, triethylamine, or a combination thereof.

20. The process of claim 15, wherein the PG forms an ether, a silyl ether, an acetal or ketal, or an acyl.

21. The process of claim 20, wherein the PG is an acyl.

22. The process of claim 21, wherein the acyl is acetyl, pivaloyl, benzoyl (Bz), 4-bromobenzoyl (Br-Bz), 4-chlorobenzoyl, 4-iodobenzoyl, 4-fluorobenzoyl, 4-nitrobenzoyl, 4-phenylbenzoyl, 1-naphthoyl, or 2-naphthoyl.

23. The process of claim 22, wherein PG is acetyl.

24. The compound of claim 23, wherein PG is pivaloyl.

25. The process of claim 22, wherein PG is benzoyl, 4-bromobenzoyl, 4-nitrobenzoyl, 4-phenylbenzoyl, 1-naphthoyl, or 2-naphthoyl.

26. The process of claim 25, wherein PG is 4-bromobenzoyl.

27. The process of claim 20, wherein PG forms an ether.

28. The process of claim 27, wherein the ether is methoxy, ethoxy, propoxy, butoxy, methoxymethyl acetal (MOM), 2-methyoxyethoxymethyl ester (MEM), ethoxyethyl acetal (EE), methoxypropyl ether (MOP), benzyloxymethyl acetal (BOM), benzyl ether (Bn), 4-methoxybenzyl ether (PMB), or 2-naphthylmethyl ether (Nap).

29. The process of claim 20, wherein PG forms an acetal or ketal.

30. The process of claim 29, wherein PG forms tetrahydropyranyl acetal (THP).

31. The process of claim 20, wherein PG forms a silyl ether.

32. The process of claim 31, wherein PG forms triethylsilyl ether (TES), triisopropylsilyl ether (TIPS), trimethylsilyl ether (TMS), tert-butyldimethylsilyl ether (TBS), or tert-butyldiphenylsilyl ether (TBDPS).

33. The process of claim 16, wherein PG is acetyl and synthesizing compound C comprises admixing compound B, acetic anhydride, triethylamine, and 4-dimethylaminopyridine (DMAP) in the absence of solvent.

34. The process of claim 16, wherein PG is 4-bromobenzoyl, and synthesizing compound C comprises admixing compound B, 4-bromobenzoyl chloride, and pyridine in a solvent.

35. The process of claim 34, wherein the solvent comprises tetrahydrofuran ("THF"), 2-methyltetrahydrofuran, cyclopentyl methyl ether, tert-butyl methyl ether, 1,2-dimethoxyethane, toluene, hexane, heptane, 1,4-dioxane, dichloromethane, 1,2-dichloroethylene, or a combination thereof.

36. The process of claim 15, wherein the admixing of compound B and the protecting group reagent is for 30 minutes to 48 hours.

37. The process of claim 36, wherein the admixing is for 1.5 hours.

38. The process of claim 16, wherein admixing compound B and the protecting group reagent is at a temperature of 0° C. to 40° C.

39. The process of claim 15, wherein compound B, prior to admixing with the protecting group reagent, is prepared as a free acid of compound B from a salt of Compound B.

40. The process of claim 39, wherein compound B salt is an ammonium salt.

41. The process of claim 40, wherein compound B salt comprises a cation of

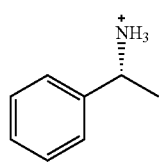

42. The process of claim 39, wherein compound B free acid is prepared by admixing compound B salt and phosphoric acid in a solvent to form the compound B free acid.

43. The process of claim 42, wherein the solvent comprises 2-methyltetrahydrofuran (2-MeTHF) or toluene.

44. The process of claim 15, wherein the activating agent comprises an acid anhydride, acid chloride agent, carbodiimide agent, uronium agent, aminium agent, phosphonium agent, or a combination thereof.

45. The process of claim 44, wherein the activating agent is SO$_2$Cl, oxalyl chloride, propanephosphonic acid anhydride, or a combination thereof.

46. The process of claim 15, wherein the amine base for admixing compound C and compound E comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), or a combination thereof.

47. The process of claim 46, wherein the amine base comprises diisopropylethylamine, triethylamine, or a combination thereof.

48. The process of claim 15, wherein compound E and compound C are present in a molar ratio of 1:1 to 1.5:1 Compound C:Compound E.

49. The process of claim 15, wherein admixing compound C, compound E, the activating agent and amine base occurs in a solvent.

50. The process of claim 49, wherein the solvent comprises tetrahydrofuran ("THF"), 2-methyltetrahydrofuran, cyclopentyl methyl ether, tert-butyl methyl ether, dichloromethane, dichloroethane, 1,2-dimethoxyethane, toluene, hexane, heptane, 1,4-dioxane, N,N'-dimethylformamide, N,N'-dimethylacetamide, N-methyl-2-pyrrolidone, or a combination thereof.

51. The process of claim 50, wherein the solvent comprises toluene.

52. A process for synthesizing compound A, or a salt or solvate thereof:

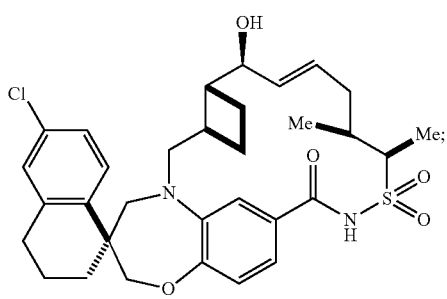

comprising:
admixing an organometallic catalyst and compound D

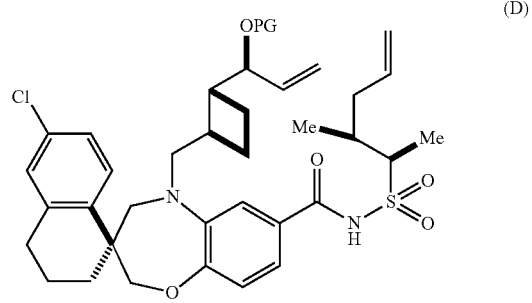

or salt or solvate thereof in a solvent, to form compound F

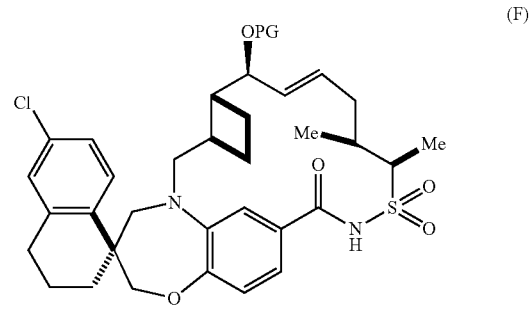

or a salt thereof, and
deprotecting compound F to form compound A, wherein PG is an alcohol protecting group.

53. The method of claim 52, wherein compound D is synthesized by the process of claim 15.

54. The process of claim 52, wherein the organometallic catalyst comprises molybdenum or ruthenium.

55. The process of claim 52, wherein the organometallic catalyst comprises a Grubbs' 1st generation catalyst, Grubbs' 2nd generation catalyst, Grubbs' 3rd generation catalyst, Hoveyda-Grubbs' 1st generation catalyst, Hoveyda-Grubbs' 2nd generation catalyst or a combination thereof.

56. The process of claim 52, wherein the organometallic catalyst is

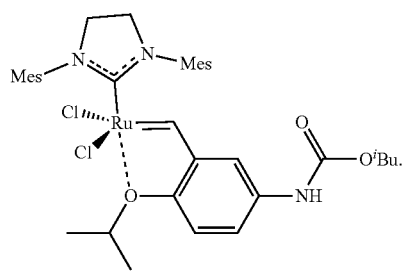

57. The process of claim 52, wherein the solvent comprises a nonpolar organic solvent.

58. The process of claim 57, wherein the solvent is toluene, hexane, heptane, 1,4-dioxane, or a combination thereof.

59. The process of claim 52, wherein the admixing of compound D and the organometallic catalyst is at a temperature of about 50° C. to about 115° C.

60. The process of claim 59, wherein the admixing of compound D and the organometallic catalyst is at a temperature of about 80° C.

61. The process of claim 52, wherein compound A is used to synthesize Compound A1 or a salt or solvate thereof

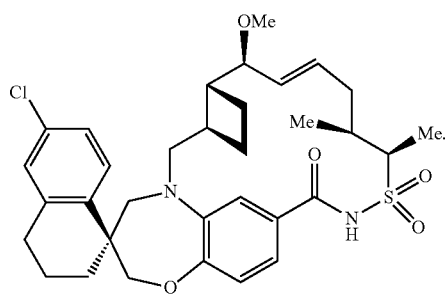

(A1)

62. The process of claim 52, wherein compound A is used to synthesize Compound A2 or a salt or solvate thereof

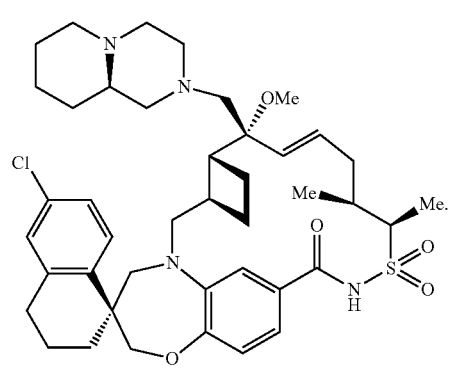

(A2)

* * * * *